United States Patent
Goyal et al.

(10) Patent No.: US 10,002,326 B2
(45) Date of Patent: *Jun. 19, 2018

(54) COMPILATION OF FINITE AUTOMATA BASED ON MEMORY HIERARCHY

(71) Applicant: Cavium, Inc., San Jose, CA (US)

(72) Inventors: Rajan Goyal, Saratoga, CA (US); Satyanarayana Lakshmipathi Billa, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/252,293

(22) Filed: Apr. 14, 2014

(65) Prior Publication Data

US 2015/0295889 A1    Oct. 15, 2015

(51) Int. Cl.
*G06N 5/04*    (2006.01)
*H04L 29/06*    (2006.01)
*G06N 5/00*    (2006.01)

(52) U.S. Cl.
CPC ............ *G06N 5/047* (2013.01); *G06N 5/00* (2013.01); *H04L 63/1408* (2013.01)

(58) Field of Classification Search
CPC ............ G06F 17/30982; G06F 21/564; G06F 17/30985; Y10S 707/99936; H04L 69/161; H04L 69/16; H04L 69/22
USPC .......................................................... 726/11
See application file for complete search history.

(56) References Cited

U.S. PATENT DOCUMENTS

| | | |
|---|---|---|
| 5,428,554 A | 6/1995 | Laskoski |
| 5,608,662 A | 3/1997 | Large et al. |
| 5,893,142 A | 4/1999 | Moyer et al. |
| 6,314,513 B1 | 11/2001 | Ross et al. |
| 6,954,424 B2 | 10/2005 | Barrack et al. |
| 7,046,848 B1 | 5/2006 | Olcott |
| 7,225,188 B1 | 5/2007 | Gai et al. |
| 7,260,558 B1 | 8/2007 | Cheng et al. |
| 7,308,446 B1 | 12/2007 | Panagrahy et al. |

(Continued)

FOREIGN PATENT DOCUMENTS

| | | |
|---|---|---|
| CN | 1716958 A | 1/2006 |
| CN | 1759393 A | 4/2006 |

(Continued)

OTHER PUBLICATIONS

Becchi, M., "Data Structures, Algorithms and Architectures for Efficient Regular Expression Evaluation," Washington University in St. Louis School of Engineering & Applied Science, published May 2009.

(Continued)

*Primary Examiner* — Harunur Rashid

(74) *Attorney, Agent, or Firm* — Hamilton, Brook, Smith & Reynolds, P.C.

(57) ABSTRACT

At least one per-pattern non-deterministic finite automaton (NFA) may be generated for a single regular expression pattern and may include a respective set of nodes. Nodes of the respective set of nodes of each per-pattern NFA generated may be distributed for storing in a plurality of memories based on hierarchical levels mapped to the plurality of memories and per-pattern NFA storage allocation settings configured for the hierarchical levels, optimizing run time performance for matching regular expression patterns in an input stream.

37 Claims, 18 Drawing Sheets

(56) References Cited

U.S. PATENT DOCUMENTS

| | | |
|---|---|---|
| 7,460,473 B1 | 12/2008 | Kodama et al. |
| 7,594,081 B2 | 9/2009 | Bouchard et al. |
| 7,702,629 B2 | 4/2010 | Cytron et al. |
| 7,710,988 B1 | 5/2010 | Tripathi et al. |
| 7,805,392 B1* | 9/2010 | Steele ............... G06F 17/30982 706/48 |
| 7,870,161 B2 | 1/2011 | Wang |
| 7,944,920 B2 | 5/2011 | Pandya |
| 7,949,683 B2 | 5/2011 | Goyal |
| 7,962,434 B2 | 6/2011 | Estan et al. |
| 8,024,802 B1 | 9/2011 | Preston |
| 8,051,085 B1 | 11/2011 | Srinivasan et al. |
| 8,180,803 B2 | 5/2012 | Goyal |
| 8,301,788 B2 | 10/2012 | Bouchard et al. |
| 8,473,523 B2 | 1/2013 | Goyal |
| 8,392,590 B2 | 3/2013 | Bouchard et al. |
| 8,407,794 B2 | 3/2013 | Kim et al. |
| 8,516,456 B1 | 8/2013 | Starovoitov et al. |
| 8,554,698 B2 | 10/2013 | Bando et al. |
| 8,566,344 B2 | 10/2013 | Bando et al. |
| 8,683,590 B2 | 3/2014 | Namjoshi et al. |
| 8,862,585 B2 | 10/2014 | Chao et al. |
| 9,083,731 B2 | 7/2015 | Namjoshi et al. |
| 9,203,805 B2 | 12/2015 | Goyal et al. |
| 9,280,600 B2 | 3/2016 | Hay et al. |
| 9,398,033 B2 | 7/2016 | Goyal et al. |
| 9,419,943 B2 | 8/2016 | Goyal et al. |
| 9,426,165 B2 | 8/2016 | Billa et al. |
| 9,426,166 B2 | 8/2016 | Billa et al. |
| 9,432,284 B2 | 8/2016 | Goyal et al. |
| 9,438,561 B2 | 9/2016 | Goyal et al. |
| 9,495,479 B2 | 11/2016 | Goyal |
| 9,507,563 B2 | 11/2016 | Billa et al. |
| 9,514,246 B2 | 12/2016 | Billa et al. |
| 9,563,399 B2 | 2/2017 | Goyal et al. |
| 9,602,532 B2 | 3/2017 | Goyal et al. |
| 9,762,544 B2 | 9/2017 | Goyal et al. |
| 9,785,403 B2 | 10/2017 | Goyal et al. |
| 9,823,895 B2 | 11/2017 | Goyal et al. |
| 2001/0033552 A1 | 10/2001 | Barrack et al. |
| 2003/0195874 A1 | 10/2003 | Akaboshi |
| 2004/0059443 A1 | 3/2004 | Sharangpani |
| 2004/0162826 A1 | 8/2004 | Wyschogrod et al. |
| 2004/0172234 A1 | 9/2004 | Dapp et al. |
| 2004/0225999 A1 | 11/2004 | Nuss |
| 2005/0108518 A1 | 5/2005 | Pandya |
| 2005/0278781 A1 | 12/2005 | Zhao et al. |
| 2006/0069872 A1 | 3/2006 | Bouchard et al. |
| 2006/0075206 A1* | 4/2006 | Bouchard ........... G06F 9/30003 711/202 |
| 2006/0085533 A1 | 4/2006 | Hussain et al. |
| 2006/0101195 A1* | 5/2006 | Jain .................... H04L 63/1408 711/104 |
| 2006/0136570 A1 | 6/2006 | Pandya |
| 2006/0224828 A1* | 10/2006 | Chen ..................... G06F 21/563 711/117 |
| 2006/0235811 A1 | 10/2006 | Fairweather |
| 2007/0192863 A1 | 8/2007 | Kapoor et al. |
| 2007/0282833 A1 | 12/2007 | McMillen |
| 2008/0034427 A1 | 2/2008 | Cadambi et al. |
| 2008/0047012 A1* | 2/2008 | Rubin ................ H04L 63/1425 726/23 |
| 2008/0059464 A1 | 3/2008 | Law et al. |
| 2008/0071783 A1 | 3/2008 | Langmead et al. |
| 2008/0077793 A1 | 3/2008 | Tan et al. |
| 2008/0082946 A1 | 4/2008 | Zilic et al. |
| 2008/0097959 A1 | 4/2008 | Chen et al. |
| 2008/0101371 A1 | 5/2008 | Law et al. |
| 2008/0189784 A1 | 8/2008 | Mangione-Smith et al. |
| 2008/0228991 A1 | 9/2008 | Ferroussat et al. |
| 2008/0229415 A1 | 9/2008 | Kapoor et al. |
| 2008/0262991 A1 | 10/2008 | Kapoor et al. |
| 2008/0270833 A1 | 10/2008 | McMillen |
| 2008/0271141 A1* | 10/2008 | Goldman ............ H04L 63/1416 726/22 |
| 2009/0106183 A1 | 4/2009 | Estan et al. |
| 2009/0119279 A1 | 5/2009 | Goyal et al. |
| 2009/0119399 A1* | 5/2009 | Hussain ............ G06F 17/30958 709/224 |
| 2009/0138440 A1 | 5/2009 | Goyal |
| 2009/0138494 A1 | 5/2009 | Goyal |
| 2010/0050177 A1 | 2/2010 | Goyal et al. |
| 2010/0095162 A1 | 4/2010 | Inakoshi |
| 2010/0114973 A1 | 5/2010 | Goyal |
| 2010/0138367 A1 | 6/2010 | Yamagaki |
| 2010/0146623 A1 | 6/2010 | Namjoshi |
| 2010/0153420 A1 | 6/2010 | Yang et al. |
| 2010/0158394 A1 | 6/2010 | Chang et al. |
| 2010/0174770 A1 | 7/2010 | Pandya |
| 2010/0192225 A1 | 7/2010 | Ma et al. |
| 2010/0198850 A1* | 8/2010 | Cytron ............... G06F 17/30985 707/758 |
| 2011/0016154 A1 | 1/2011 | Goyal et al. |
| 2011/0066637 A1 | 3/2011 | Wang |
| 2011/0072199 A1 | 3/2011 | Reiter et al. |
| 2011/0093484 A1 | 4/2011 | Bando et al. |
| 2011/0093496 A1* | 4/2011 | Bando ............... G06F 17/30985 707/769 |
| 2011/0113191 A1 | 5/2011 | Pandya |
| 2011/0119440 A1 | 5/2011 | Pandya |
| 2011/0173490 A1 | 7/2011 | Narayanaswamy et al. |
| 2011/0185077 A1 | 7/2011 | Bremler-Barr et al. |
| 2011/0238855 A1 | 9/2011 | Korsunsky et al. |
| 2011/0295779 A1* | 12/2011 | Chen ..................... G06F 17/277 706/12 |
| 2011/0320393 A1 | 12/2011 | Pandya |
| 2011/0320397 A1 | 12/2011 | Podkolzin et al. |
| 2012/0017262 A1 | 1/2012 | Kapoor et al. |
| 2012/0143854 A1* | 6/2012 | Goyal ................ H04L 63/1408 707/723 |
| 2012/0221494 A1 | 8/2012 | Pasetto et al. |
| 2012/0221497 A1 | 8/2012 | Goyal et al. |
| 2012/0275642 A1 | 11/2012 | Aller et al. |
| 2012/0284222 A1 | 11/2012 | Atasu et al. |
| 2012/0311529 A1 | 12/2012 | Beveridge et al. |
| 2013/0074081 A1 | 3/2013 | Cassetti et al. |
| 2013/0097608 A1 | 4/2013 | Kessler et al. |
| 2013/0103909 A1 | 4/2013 | Pangborn et al. |
| 2013/0133064 A1 | 5/2013 | Goyal et al. |
| 2013/0191916 A1 | 7/2013 | Yao et al. |
| 2013/0254197 A1 | 9/2013 | Hay et al. |
| 2013/0290356 A1 | 10/2013 | Yang et al. |
| 2014/0025923 A1* | 1/2014 | Klein ................. G06F 12/1027 711/207 |
| 2014/0101176 A1 | 4/2014 | Ruehle |
| 2014/0129775 A1* | 5/2014 | Ruehle ............... G06F 12/0802 711/127 |
| 2014/0143874 A1 | 5/2014 | Namjoshi et al. |
| 2014/0173254 A1 | 6/2014 | Ruehle |
| 2014/0214749 A1 | 7/2014 | Ruehle |
| 2015/0066927 A1 | 3/2015 | Goyal et al. |
| 2015/0067123 A1 | 3/2015 | Goyal et al. |
| 2015/0067200 A1 | 3/2015 | Goyal et al. |
| 2015/0067776 A1 | 3/2015 | Goyal et al. |
| 2015/0067836 A1 | 3/2015 | Billa et al. |
| 2015/0067863 A1 | 3/2015 | Billa et al. |
| 2015/0186786 A1 | 7/2015 | Goyal et al. |
| 2015/0220454 A1 | 8/2015 | Goyal et al. |
| 2015/0220845 A1 | 8/2015 | Goyal et al. |
| 2015/0262009 A1 | 9/2015 | Szabo |
| 2015/0293846 A1 | 10/2015 | Goyal et al. |
| 2015/0295891 A1 | 10/2015 | Goyal et al. |
| 2016/0021060 A1 | 1/2016 | Goyal et al. |
| 2016/0021123 A1 | 1/2016 | Goyal et al. |
| 2018/0004483 A1 | 1/2018 | Goyal et al. |

FOREIGN PATENT DOCUMENTS

| | | |
|---|---|---|
| CN | 1836245 A | 9/2006 |
| CN | 101069170 A | 11/2007 |
| CN | 101201836 A | 6/2008 |

(56) References Cited

FOREIGN PATENT DOCUMENTS

| | | |
|---|---|---|
| CN | 101296116 A | 10/2008 |
| CN | 101351784 A | 1/2009 |
| CN | 101360088 A | 2/2009 |
| CN | 101639861 A | 2/2010 |
| CN | 101650718 A | 2/2010 |
| CN | 101853301 A | 10/2010 |
| CN | 101876986 A | 11/2010 |
| CN | 101944121 A | 1/2011 |
| CN | 102148805 A | 8/2011 |
| CN | 102184197 A | 9/2011 |
| CN | 102420750 A | 4/2012 |
| CN | 102902713 A | 1/2013 |
| CN | 103166802 A | 6/2013 |
| EP | 2276217 A2 | 1/2011 |
| JP | 2007011998 A | 1/2007 |
| WO | WO 2004/013777 A1 | 2/2004 |
| WO | WO 2007/109445 A1 | 9/2007 |
| WO | WO 2008/005772 A2 | 1/2008 |
| WO | WO 2009/017131 A1 | 2/2009 |
| WO | WO 2013/078053 | 5/2013 |

OTHER PUBLICATIONS

Becchi, M., et al., "A Hybrid Finite Automation for Practical Deep Packet Inspection," published 2007.

Becchi, M., et al., "Extending Finite Automata to Efficiently Match Perl-compatible Regular Expressions", Proceedings of the 2008 CoNext Conference, Dec. 9-12, 2008.

Chodnicki, S., "An Introduction to Regular Expressions/Adventures with Open Source B1", available at http://type-exit.org/adventures-with-open-source-bi/2011/05/an-introduction-to-regular-expressions May 7, 2013 (29 pgs).

Hopcroft, J.E. and Ullman, J.D., "Introduction to Automata Theory, Languages, and Computation," *Addison-Wesley Publishing*, Reading, Massachusetts (1979). ISBN 0-201-02988-X. (See chapter 2.).

Rabin, M.O. and Scott, D., "Finite Automata and their Decision Problems," *IBM Journal of Research and Development*, 3(2): 114-125 (1959).

Singh, H., Regular Expressions, http://www.seeingwithe.org/topic7html.html (2002) downloaded May 7, 2013 (10 pgs).

Sipser, M., "Introduction to the Theory of Computation," *PWS*, Boston (1997). ISBN 0-534-94728-X. (See section 1.2: Nondeterminism, pp. 47-63.).

Sun, W., et al., "HFilter: Hybrid Finite Automation Based Stream Filtering for Deep and Recursive XML Data," School of Computer Science and Tech., published 2008.

Branch, J.W. et al., "Denial of Service Intrusion Detection Using Time Dependent Deterministic Finite Automata," *Proc. Research Conference*, Troy, NY, Oct. 2002.

Faro, S., et al., "Efficient Variants of the Backward-Oracle-Matching Algorithm," *Proceedings of Prague Stringology Conference*, 2008, pp. 146-160.

Navarro, G., "NR-grep: A Fast and Flexible Pattern Matching Tool," pp. 1-49, published 2000.

Navarro, G., "Pattern Matching," pp. 1-24, published 2002.

U.S. Office Action dated Sep. 11, 2015 for U.S. Appl. No. 14/252,299, filed April 14, 2014, entitled "Processing of Finite Automation Based on Memory Hierarchy."

Hayes, C.L., et al, "DPICO: A High Speed Deep Packet Inspection Engine Using Compact Finite Automata," ANCS'07 pp. 195-203 (2007).

U.S. Office Action dated Apr. 7, 2016 for U.S. Appl. No. 14/252,299, filed Apr. 14, 2014, entitled "Processing of Finite Automation Based on Memory Hierarchy."

U.S. Office Action dated Jul. 28, 2016 for U.S. Appl. No. 14/252,299, filed Apr. 14, 2014, entitled "Processing of Finite Automation Based on Memory Hierarchy."

U.S. Final Office Action dated Jan. 20, 2017 for U.S. Appl. No. 14/252,299, filed Apr. 14, 2014, titled "Compilation of Finite Automation Based on Memory Hierarchy".

Košař, V., et al., "Towards Efficient Field Programmable Pattern Matching Array," 2015 Euromicro Conference on Digital System Design, IEEE, pp. 1-8 (2015).

Peng, K., et al., "Chain-Based DFA Deflation for Fast and Scalable Regular Expression Matching Using TCAM," ACM/IEEE Seventh Symposium on Architectures for Networking and Communications Systems Year 2011, pp. 24-35 (2011).

Lin, C-H., et al., "Optimization of Pattern Matching Circuits for Regular Expression of FPGA," IEEE Transactions on Very Large Scale Integration (VLSI) Systems, 15(12): 1303-1310 (2007).

Clark, C.R., et al., "Scalable Pattern Matching for High Speed Networks," 12th Annual IEEE Symposium on Field Programmable Custom Computing Machines, pp. 249-257 (2004).

NITROX DPI CN17XX L7 Content Processor Family Preliminary Product Brief. Cavium Networks 2009. http://cavium.com/pdfFiles/Nitrox_DPI_PB_vl.pdf. Retrieved Apr. 6, 2017.

U.S. Office Action dated Aug. 11, 2017 for U.S. Appl. No. 14/252,299, filed Apr. 14, 2014, entitled "Compilation of Finite Automation Based on Memory Hierarchy."

U.S. Final Office Action dated Jan. 8, 2018 for U.S. Appl. No. 14/252,299, filed Apr. 14, 2014, entitled "Compilation of Finite Automation Based on Memory Hierarchy."

* cited by examiner

DFA for the pattern: ".*a[^/n]"
Graph size of 4 nodes

Note: return arrows from each
state if '/n' is seen are not shown.

| PATTERN | NUMBER OF NFA-NODES | NUMBER OF DFA-NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| • | • | • |
| • | • | • |
| • | • | • |
| .*a[^\n]$_1$...[^\n]$_n$ | $n+3$ | $2^n$ |

FIG. 2G

| | CURRENT NODE 530 | CURRENT OFFSET/ SEGMENT 532 | MATCH RESULT 534 | ACTION 536 |
|---|---|---|---|---|
| 540a | N0 | 0/h | POSITIVE | UPDATE OFFSET / TRANSITION |
| 540b | N1 | — | — | PUSH {N3,OFFSET1} / TRANSITION |
| 540c | N2 | 1/x | NEGATIVE | POP {N3,OFFSET1} / TRANSITION |
| 540d | N3 | 1/x | POSITIVE | UPDATE OFFSET / TRANSITION |
| 540e | N1 | — | — | PUSH {N3,OFFSET2} / TRANSITION |
| 540f | N2 | 2/a | POSITIVE | UPDATE OFFSET / TRANSITION |
| 540g | N4 | 3/b | POSITIVE | UPDATE OFFSET / TRANSITION |
| 540h | N5 | — | FINAL | DISCONTINUE / POP {N3,OFFSET2} / WRITE RESULT |

FIG. 5B

COMPILATION OF FINITE AUTOMATA BASED ON MEMORY HIERARCHY

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at "wire-speed" (i.e., a rate of data transfer over a physical medium of the network over which data is transmitted and received).

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor may perform such compute intensive tasks, it may not provide sufficient performance to process the data so that the data may be forwarded at wire-speed.

An Intrusion Detection System (IDS) application may inspect content of individual packets flowing through a network, and may identify suspicious patterns that may indicate an attempt to break into or compromise a system. One example of a suspicious pattern may be a particular text string in a packet followed by 100 characters later by another particular text string. Such content aware networking may require inspection of the contents of packets at wire speed. The content may be analyzed to determine whether there has been a security breach or an intrusion.

A large number of patterns and rules in the form of regular expressions (also referred to herein as regular expression patterns) may be applied to ensure that all security breaches or intrusions are detected. A regular expression is a compact method for describing a pattern in a string of characters. The simplest pattern matched by a regular expression is a single character or string of characters, for example, /c/ or /cat/. The regular expression may also include operators and meta-characters that have a special meaning Through the use of meta-characters, the regular expression may be used for more complicated searches such as, "abc.*xyz." That is, find the string "abc" followed by the string "xyz," with an unlimited number of characters in-between "abc" and "xyz." Another example is the regular expression "abc.abc.*xyz;" that is, find the string "abc," followed two characters later by the string "abc," and an unlimited number of characters later by the string "xyz."

Content searching is typically performed using a search method such as, Deterministic Finite Automata (DFA) or Non-Deterministic Finite Automata (NFA) to process the regular expression.

SUMMARY

Embodiments of the present invention provide a method, apparatus, computer program product, and corresponding system for compilation and run time processing of finite automata.

According to one embodiment, in at least one processor in a security appliance operatively coupled to a network, a method may include generating at least one per-pattern non-deterministic finite automaton (NFA). The at least one processor may be operatively coupled to a plurality of memories mapped to hierarchical levels in a memory hierarchy. Each per-pattern NFA may be generated for a single regular expression pattern and may include a respective set of nodes. The method may distribute nodes of the respective set of nodes of each per-pattern NFA for storing in the plurality of memories based on the hierarchical levels mapped and per-pattern NFA storage allocation settings configured for the hierarchical levels.

The method may include statically storing the nodes, of the respective set of nodes of each per-pattern NFA generated, in the plurality of memories, based on the distribution.

Generating the at least one per-pattern NFA may include specifying a transition from a given node to a next node via a next node address associated with the given node and configuring the next node address to identify the next node and a given memory of the plurality of memories to which the next node is distributed for storing.

The method may include configuring each per-pattern NFA storage allocation setting, of the per-pattern NFA storage allocation settings, for a respective hierarchical level, of the hierarchical levels, to denote a target number of unique nodes, of the respective set of nodes of each per-pattern NFA generated, to distribute for storing in a given memory, of the plurality of memories, that is mapped to the respective hierarchical level.

The unique nodes of the respective set of nodes may be arranged in a consecutive manner within a given per-pattern NFA of the at least one per-pattern NFA that includes the respective set of nodes.

The method may include configuring each per-pattern NFA storage allocation setting for the respective hierarchical level in a manner enabling the given memory to provide a sufficient storage capacity for storing the target number of unique nodes denoted from each per-pattern NFA generated in an event a per-pattern NFA is generated for each regular expression pattern in a set of regular expression patterns.

The method may include denoting the target number of unique nodes via an absolute value. The absolute value may be a common value for each respective set of nodes enabling each respective set of nodes to have a same value for the target number of unique nodes for storing in the given memory that is mapped to the respective hierarchical level.

The method may include denoting the target number of unique nodes via a percentage value for applying to a respective total number of nodes of each respective set of nodes enabling, each respective set of nodes to have a separate value for the target number of unique nodes for storing in the given memory that is mapped to the respective hierarchical level.

Each memory of the plurality of memories may be mapped to a respective hierarchical level, of the hierarchical levels, consecutively, in descending order, based on a performance ranking of the plurality of memories. A highest performance ranked memory of the plurality of memories may be mapped to a highest ranked hierarchical level of the hierarchical levels.

The per-pattern NFA storage allocation settings may include a first per-pattern NFA storage allocation setting and a second per-pattern NFA storage allocation setting. The hierarchical levels may include a highest ranked hierarchical level and a next highest ranked hierarchical level. The first per-pattern NFA storage allocation setting may be configured for the highest ranked hierarchical level. The second per-pattern NFA storage allocation setting may be configured for the next highest ranked hierarchical level.

Distributing the nodes of the respective set of nodes of each per-pattern NFA generated may include distributing in a consecutive manner that includes a first distribution, of the nodes of the respective set of nodes, for storing in a first memory of the plurality of memories. The first memory may be mapped to a highest ranked hierarchical level of the hierarchical levels. Distributing may include at least one second distribution, of the nodes of the respective set of nodes, based on at least one undistributed node remaining in the respective set of nodes. Each at least one second distribution may be for storing in a given memory of the plurality of memories. The given memory may be mapped to a given hierarchical level of the hierarchical levels, consecutively lower, per distribution of the nodes of the respective set of nodes, than the highest ranked hierarchical level.

A given distribution of the at least one second distribution may include all undistributed nodes remaining in the respective set of nodes if the given hierarchical level is a lowest ranked hierarchical level of the hierarchical levels.

The method may include maximizing a number of nodes in the first distribution and the number maximized may be limited by a respective per-pattern NFA storage allocation setting, of the per-pattern NFA storage allocation settings, configured for the highest ranked hierarchical level.

The method may include maximizing a number of nodes in each at least one second distribution and the number maximized may be limited, per distribution, by a respective per-pattern NFA storage allocation setting, of the per-pattern NFA storage allocation settings, configured for the given hierarchical level.

The method may include statically storing the nodes of the respective set of nodes of each per-pattern NFA, enabling a walk of the nodes of each respective set of nodes, with segments of payloads in an input stream received from the network, to determine a match of at least one regular expression pattern in the input stream.

The walk may progress based on individual nodes of the respective set of nodes matching segments of the payloads.

The method may further include determining the per-pattern NFA storage allocation settings based on a total number of regular expression patterns in a set of regular expression patterns and a desired performance metric associated with the walk.

The method may include generating a unified deterministic finite automaton (DFA) based on at least one subpattern selected from each pattern in a set of regular expression patterns and storing the unified DFA in a given memory of the plurality of memories.

The plurality of memories may include a first memory, a second memory, and a third memory, and the first and second memories may be co-located on a chip with the at least one processor and the third memory may be an external memory located off the chip and mapped to a lowest ranked hierarchical level of the hierarchical levels.

Another example embodiment disclosed herein includes an apparatus corresponding to operations consistent with the method embodiments disclosed herein.

Further, yet another example embodiment may include a non-transitory computer-readable medium having stored thereon a sequence of instructions which, when loaded and executed by a processor, causes a processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-G are example NFA and DFA graphs and a table illustrating the concept of graph explosion.

FIG. 5B is a table of an example embodiment of processing cycles for walking the per-pattern NFA graph of FIG. 5A with a payload.

DETAILED DESCRIPTION

Before describing example embodiments of the present invention in detail, an example security application in which the embodiments may be implemented and typical processing using deterministic finite automata (DFA) and non-deterministic finite automata (NFA) are described immediately below to help the reader understand the inventive features disclosed herein.

Figure 1:
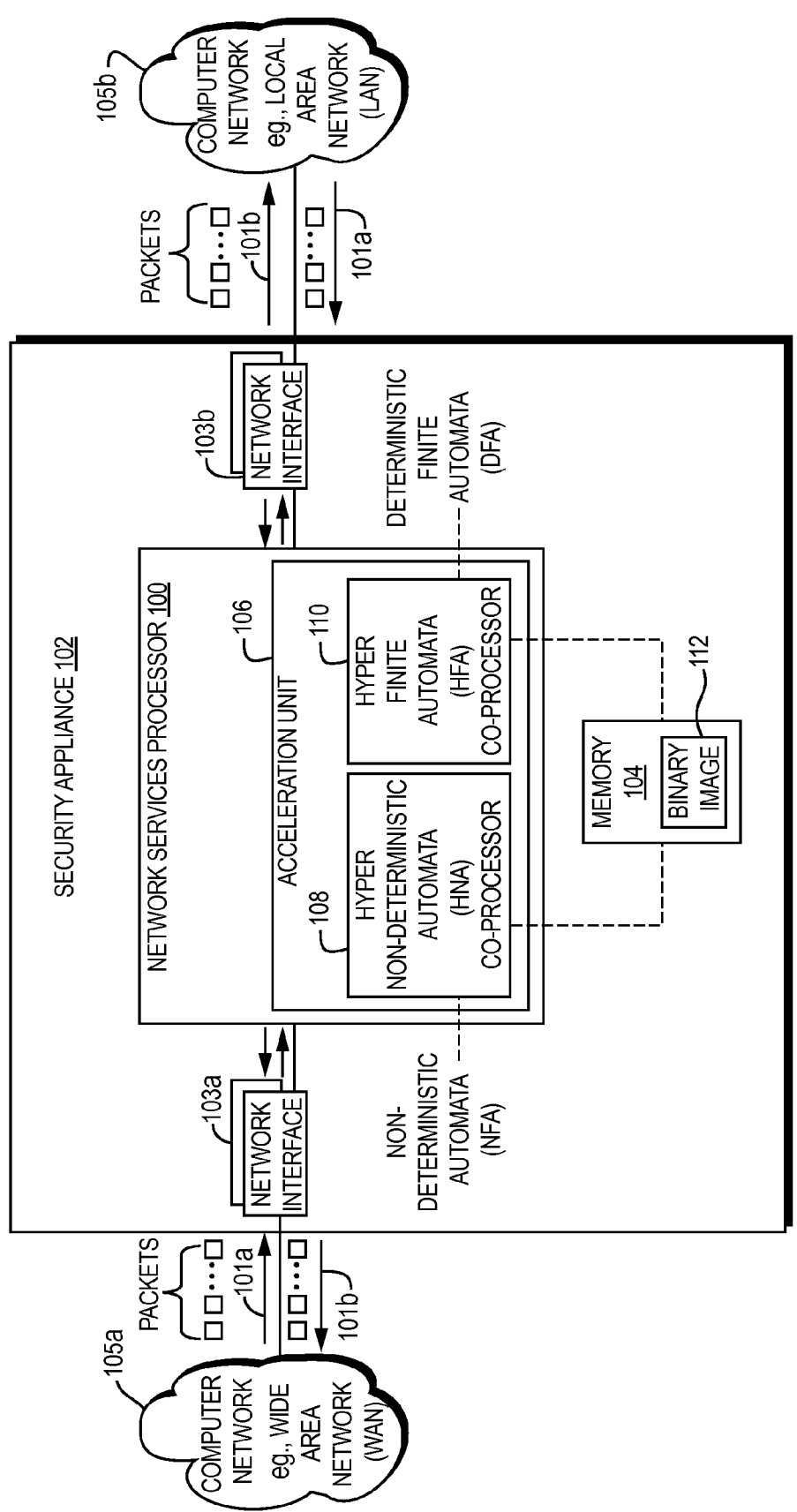
FIG. 1 is a block diagram of an embodiment of a security appliance in which embodiments disclosed herein may be implemented.

FIG. 1 is a block diagram of an embodiment of a security appliance 102 in which embodiments disclosed herein may be implemented. The security appliance 102 may include a network services processor 100. The security appliance 102 may be a standalone system that may switch packets received at one network interface 103a to another network interface 103b and may perform a plurality of security functions on received packets prior to forwarding the packets. For example, the security appliance 102 may be used to perform security processing on packets 101a that may be received on a Wide Area Network (WAN) 105a, or any other suitable network, prior to forwarding the processed packets 101b to a Local Area Network (LAN) 105b, or any other suitable network.

The network services processor 100 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (e.g., packet processing operations) for upper level network protocols, for example L4-L7, and enable processing of upper level network protocols in received packets to be performed to forward packets at wire-speed. By processing the protocols to forward the packets at wire-speed, the network services processor 100 does not slow down the network data transfer rate. The network services processor 100 may receive packets from the network interfaces 103a or 103b that may be physical hardware interfaces, and may perform L2-L7 network protocol processing on the received packets. The network services processor 100 may subsequently forward processed packets 101b through the network interfaces 103a or 103b to another hop in the network, a final destination, or through another bus (not shown) for further processing by a host processor (not shown). The network protocol processing may include processing of network security protocols such as Firewall, Application Firewall, Virtual Private Network (VPN) including IP Security (IPSec) and/or Secure Sockets Layer (SSL), Intrusion Detection System (IDS), Anti-virus (AV), or any other suitable network protocol.

The network services processor 100 may deliver high application performance using a plurality of processors (i.e., cores). Each of the cores (not shown) may be dedicated to performing data plane, control plane operations, or a combination thereof. A data plane operation may include packet operations for forwarding packets. A control plane operation may include processing of portions of complex higher level protocols such as Internet Protocol Security (IPSec), Transmission Control Protocol (TCP), Secure Sockets Layer (SSL), or any other suitable higher level protocol. The data plane operation may include processing of other portions of these complex higher level protocols.

The network services processor 100 may also include application specific co-processors that may offload the cores so that the network services processor 100 achieves high-throughput. For example, the network services processor 100 may include an acceleration unit 106 that may include a hyper non-deterministic automata (HNA) co-processor 108 for hardware acceleration of NFA processing and a hyper finite automata (HFA) co-processor 110 for hardware acceleration of DFA processing. The HNA 108 and HFA 110 co-processors may be configured to offload the network services processor 100 general purpose cores (not shown) from the heavy burden of performing compute and memory intensive pattern matching methods.

The network services processor 100 may perform pattern searching, regular expression processing, content validation, transformation, and security accelerate packet processing. The regular expression processing and the pattern searching may be used to perform string matching for AV and IDS applications and other applications that may require string matching. A memory controller (not shown) in the network services processor 100 may control access to a memory 104 that is operatively coupled to the network services processor 100. The memory 104 may be internal (i.e., on-chip) or external (i.e., off chip), or a combination thereof, and may be configured to store data packets received, such as packets 101a for processing by the network services processor 100. The memory 104 may be configured to store compiled rules data utilized for lookup and pattern matching in DFA and NFA graph expression searches. The compiled rules data may be stored as a binary image 112 that may include compiled rules data for both DFA and NFA, or multiple binary images separating DFA compiled rules data from NFA compiled rules data.

Typical content aware application processing may use either a DFA or an NFA to recognize patterns in content of received packets. DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z and 0-9, and meta-characters, such as, *, ^ and |. The atomic elements of a regular expression are the symbols (single characters) to be matched. Atomic elements may be combined with meta-characters that allow concatenation, alternation (|), and Kleene-star (*). The meta-character for concatenation may be used to create multiple character matching patterns from a single character (or sub-strings) while the meta-character for alternation (|) may be used to create a regular expression that can match any of two or more sub-strings. The meta-character Kleene-star (*) allows a pattern to match any number of times, including no occurrences of the preceding character or string of characters.

Combining different operators and single characters allows complex subpatterns of expressions to be constructed. For example, a subpattern such as (th(is|at)*) may match multiple character strings, such as: th, this, that, thisis, thisat, thatis, or thatat. Another example of a complex subpattern of an expression may be one that incorporates a character class construct [ . . . ] that allows listing of a list of characters for which to search. For example, gr[ea]t' looks for both grey and gray. Other complex subpattern examples are those that may use a dash to indicate a range of characters, for example, [A-Z], or a meta-character "." that matches any one character. An element of the pattern may be an atomic element or a combination of one or more atomic elements in combination with one or more meta-characters.

The input to the DFA or NFA state machine typically includes segments, such as a string of (8-bit) bytes, that is, the alphabet may be a single byte (one character or symbol), from an input stream (i.e., received packets). Each segment (e.g., byte) in the input stream may result in a transition from one state to another state. The states and the transition functions of the DFA or NFA state machine may be represented by a graph of nodes. Each node in the graph may represent a state and arcs (also referred to herein as transitions or transition arcs) in the graph may represent state transitions. A current state of the state machine may be represented by a node identifier that selects a particular node in the graph.

Using DFA to process a regular expression and to find a pattern or patterns described by a regular expression in an input stream of characters may be characterized as having deterministic run time performance. A next state of a DFA may be determined from an input character (or symbol), and a current state of the DFA, because there is only one state transition per DFA state. As such, run time performance of the DFA is said to be deterministic and the behavior can be completely predicted from the input. However, a tradeoff for determinism is a graph in which the number of nodes (or graph size) may grow exponentially with the size of a pattern.

In contrast, the number of nodes (or graph size) of an NFA graph may be characterized as growing linearly with the size of the pattern. However, using NFA to process the regular expression, and to find a pattern or patterns described by the regular expression in the input stream of characters, may be characterized as having non-deterministic run time performance. For example, given an input character (or symbol) and a current state of the NFA, it is possible that there is more than one next state of the NFA to which to transition. As such, a next state of the NFA cannot be uniquely determined from the input and the current state of the NFA. Thus, run time performance of the NFA is said to be non-deterministic as the behavior cannot be completely predicted from the input.

Figure 2A:
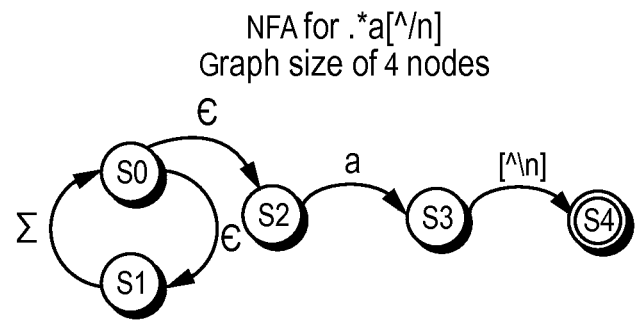
Figure 2B:
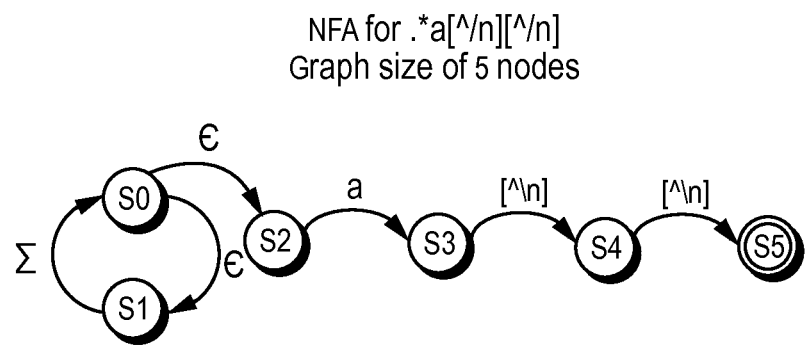
Figure 2C:
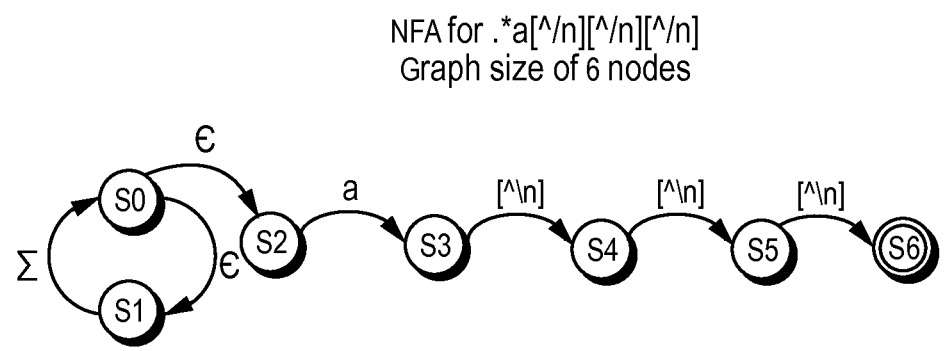
Figure 2D:
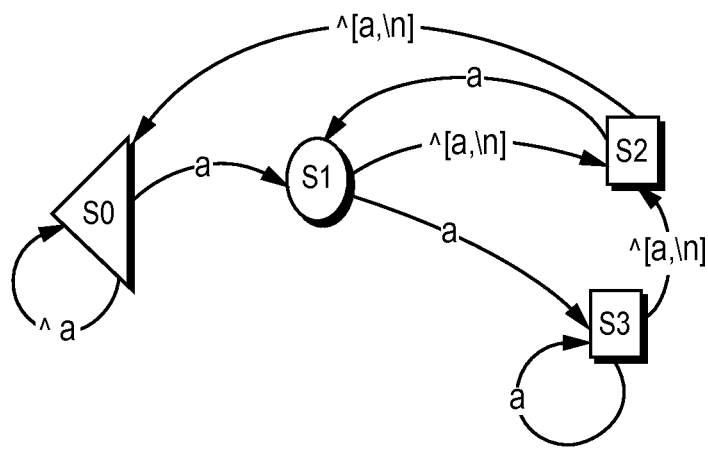
Figure 2E:
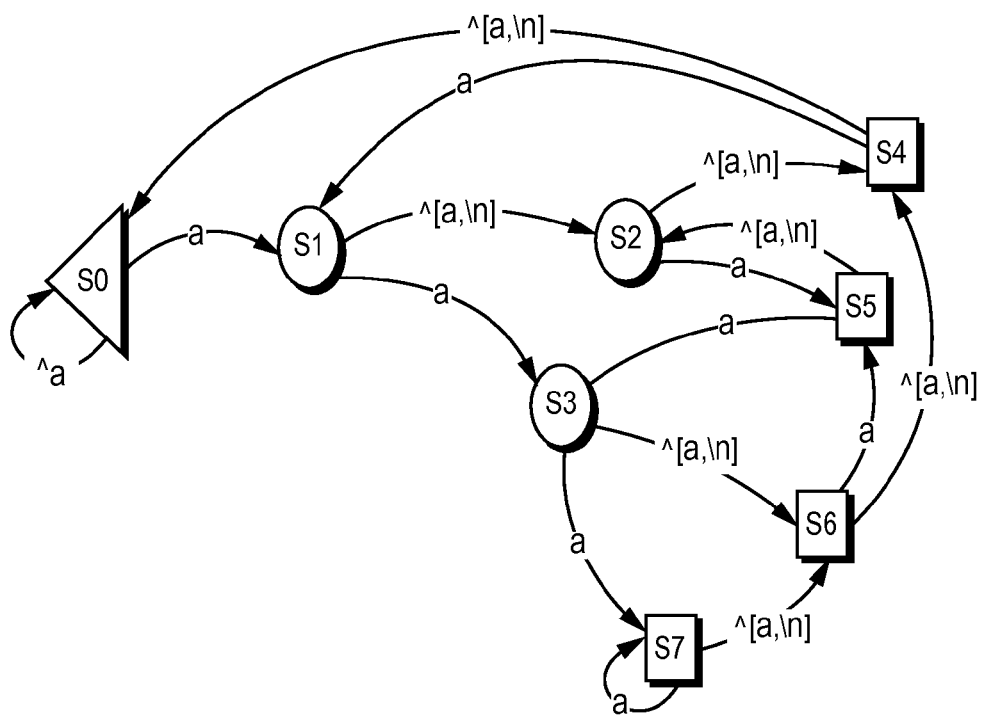
Figure 2F:
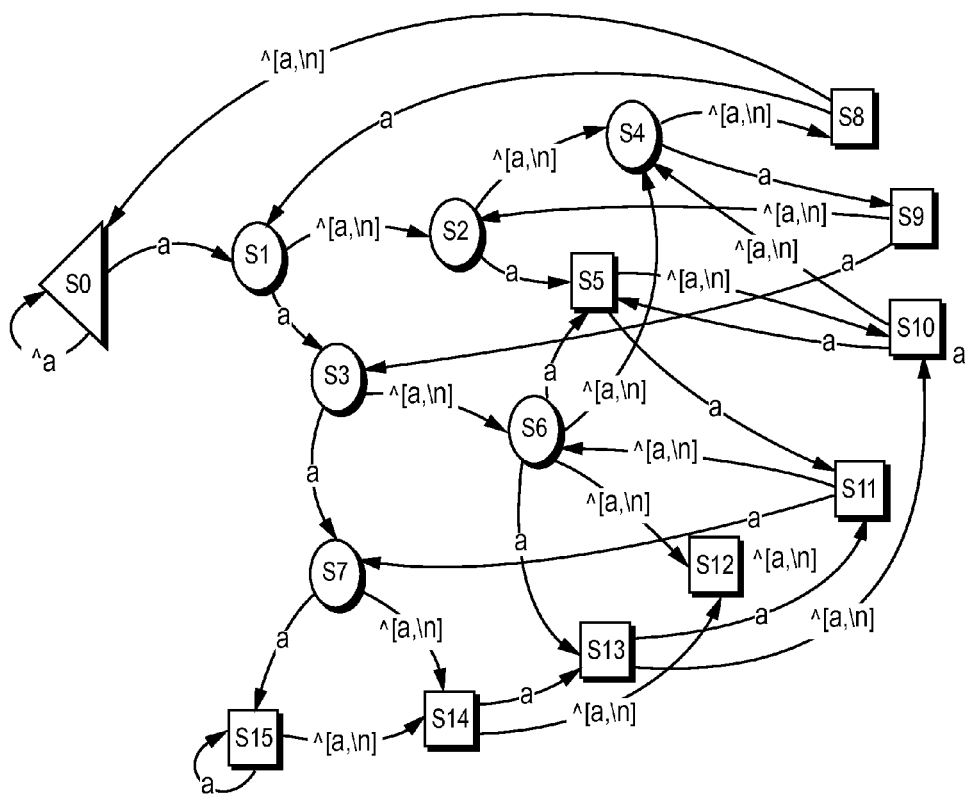

FIGS. 2A-G show the concept of DFA "graph explosion." FIGS. 2A, 2B, and 2C show NFA graphs for patterns ".*a[^\n]," ".*a[^\n] [^\n]," ".*a[^\n] [^\n] [^\n]," respectively, and FIGS. 2D, 2E, and 2F show DFA graphs for the same patterns, respectively. As shown in FIGS. 2A-2F, and summarized by the table of FIG. 2G, NFA may grow linearly for some patterns while DFA for the same patterns may grow exponentially resulting in a graph explosion. As shown, for a given pattern or patterns, a number of DFA states may be larger than a number of NFA states, typically on the order of several hundred more or a thousand more states. This is an example of "graph explosion," which is a hallmark characteristic of DFA.

According to embodiments disclosed herein, content searching may be performed using DFA, NFA, or a combination thereof. According to one embodiment, a run time processor, co-processor, or a combination thereof, may be implemented in hardware and may be configured to implement a compiler and a walker.

The compiler may compile a pattern or an input list of patterns (also known as signatures or rules) into the DFA, NFA, or combination thereof. The DFA and NFA may be binary data structures, such as DFA and NFA graphs and tables.

The walker may perform run time processing, i.e. actions for identifying an existence of a pattern in an input stream, or matching the pattern to content in the input stream. Content may be a payload portion of an Internet Protocol (IP) datagram, or any other suitable payload in an input stream. Run time processing of DFA or NFA graphs may be referred to as walking the DFA or NFA graphs, with the payload, to determine a pattern match. A processor configured to generate DFA, NFA, or a combination thereof, may be referred to herein as a compiler. A processor configured to implement run time processing of a payload using the generated DFA, NFA, or combination thereof, may be referred to herein as a walker. According to embodiments disclosed herein, the network services processor 100 may be configured to implement a compiler and a walker in the security appliance 102.

Figure 3A:
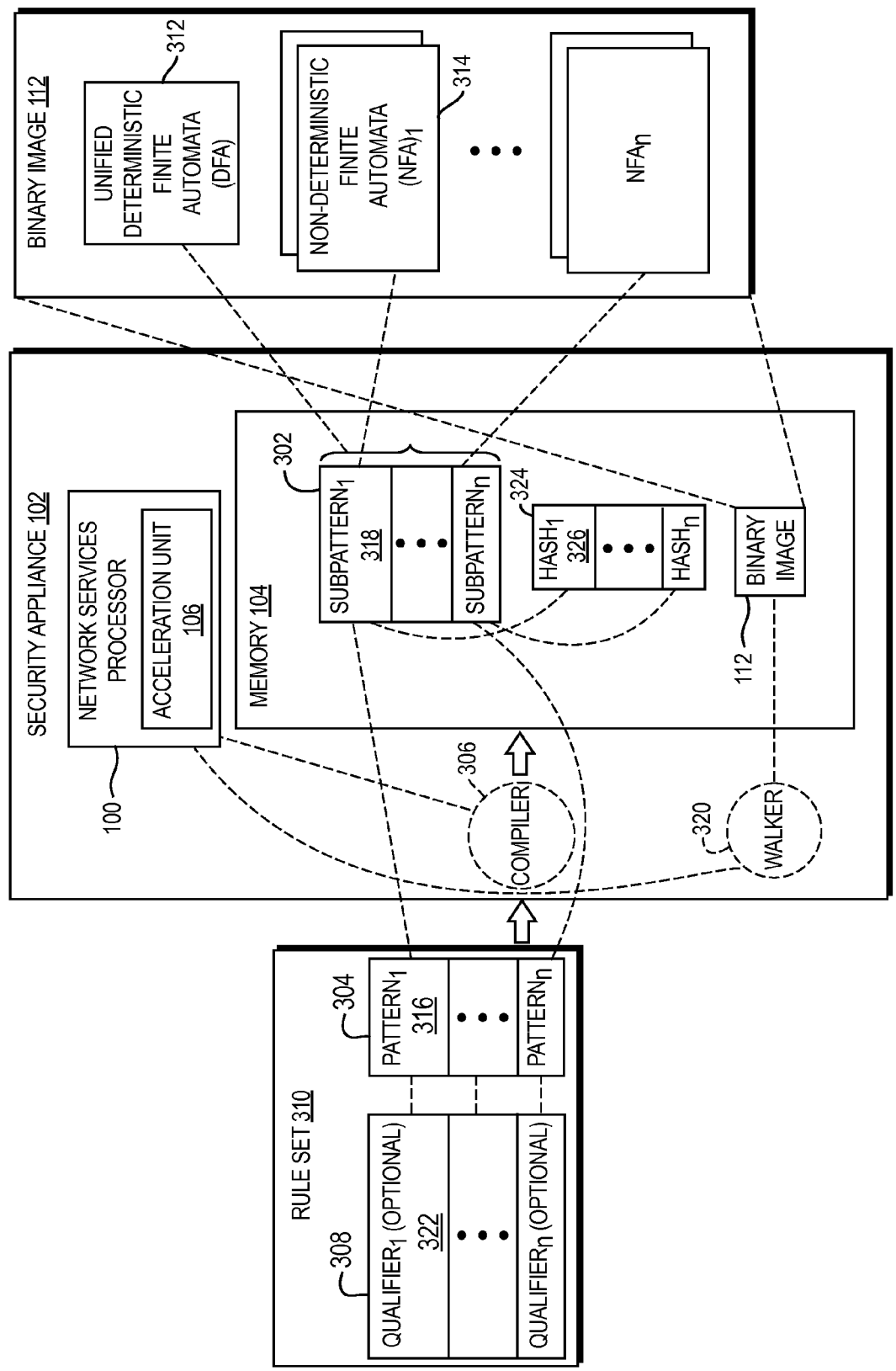
FIG. 3A is another block diagram of an embodiment of a security appliance in which embodiments disclosed herein may be implemented.

FIG. 3A is a block diagram of another embodiment of the security appliance 102 of FIG. 1 in which embodiments disclosed herein may be implemented. As disclosed in reference to FIG. 1, the security appliance 102 may be operatively coupled to one or more networks and may comprise the memory 104 and the network services processor 100 that may include the acceleration unit 106. In reference to FIG. 3A, the network services processor 100 may be configured to implement a compiler 306 that generates the binary image 112 and a walker 320 that uses the binary image 112. For example, the compiler 306 may generate the binary image 112 that includes compiled rules data used by the walker 320 for performing pattern matching methods on received packets 101a (shown in FIG. 1). According to embodiments disclosed herein, the compiler 306 may generate the binary image 112 by determining compiled rules data for DFA, NFA, or a combination thereof, based on at least one heuristic as described further below. The compiler 306 may determine rules data advantageously suited for DFA and NFA.

According to embodiments disclosed herein, the compiler 306 may generate the binary image 112 by processing a rule set 310 that may include a set of one or more regular expression patterns 304 and optional qualifiers 308. From the rule set 310, the compiler 306 may generate a unified DFA 312 using subpatterns selected from all of the one or more regular expression patterns and at least one NFA 314 for at least one pattern in the set of one or more regular expression patterns 304 for use by the walker 320 during run time processing, and metadata (not shown) including mapping information for transitioning the walker 320 between states (not shown) of the unified DFA 312 and states of the at least one NFA 314.

The unified DFA 312 and the at least one NFA 314 may be represented data structure-wise as graphs, or in any other suitable form, and the mapping in the metadata may be represented data structure-wise as one or more tables, or in any other suitable form. According to embodiments disclosed herein, if a subpattern selected from a pattern is the pattern, no NFA is generated for the pattern. According to embodiments disclosed herein, each NFA that is generated may be for a particular pattern in the set, whereas a unified DFA may be generated based on all subpatterns from all patterns in the set.

The walker 320 walks the unified DFA 312 and the at least one NFA 314 with a payload by transitioning states of the unified DFA 312 and the at least one NFA based on consuming (i.e., processing) segments, such as bytes from the payload in the received packets 101a. As such, the walker 320 walks the payload through the unified DFA 312 and the at least one NFA 314 that may be a per-pattern NFA generated for a single regular expression pattern.

The rule set 310 may include a set of one or more regular expression patterns 304 and may be in a form of a Perl Compatible Regular Expression (PCRE) or any other suitable form. PCRE has become a de facto standard for regular expression syntax in security and networking applications. As more applications requiring deep packet inspections have emerged or more threats have become prevalent in the Internet, corresponding signatures/patterns to identify virus/attacks or applications have also become more complex. For example, signature databases have evolved from having simple string patterns to regular expression (regex) patterns with wild card characters, ranges, character classes, and advanced PCRE signatures.

As shown in FIG. 3A, the optional qualifiers 308 may each be associated with a pattern in the set of regular expression patterns 304. For example, optional qualifiers 322 may be associated with pattern 316. The optional qualifiers 308 may each be one or more qualifiers designating desired custom, advanced PCRE signature options, or other suitable options for processing the pattern associated with the qualifiers. For example, the qualifiers 322 may indicate whether or not a start offset (i.e., a position in a payload of a first matching character of a pattern that matches in the payload) option of the advanced PCRE signature options for the pattern 316 is desired.

According to embodiments disclosed herein, the compiler 306 may generate a unified DFA 312 using subpatterns 302 selected from all patterns in the set of one or more regular expression patterns 304. The compiler 306 may select subpatterns 302 from each pattern in the set of one or more regular expression patterns 304 based on at least one heuristic, as described further below. The compiler 306 may also generate at least one NFA 314 for at least one pattern 316 in the set, a portion (not shown) of the at least one pattern 316 used for generating the at least one NFA 314, and at least one walk direction for run time processing (i.e. walking) of the at least one NFA 314, may be determined based on whether a length of the subpattern selected 318 is fixed or variable and a location of the subpattern selected 318 within the at least one pattern 316. The compiler 306 may store the unified DFA 312 and the at least one NFA 314 in the at least one memory 104.

The compiler may determine whether length of the potential subpatterns selected is fixed or variable. For example, length of a subpattern such as "cdef" may be determined to have a fixed length of 4 as "cdef" is a string, whereas complex subpatterns including operators may be determined as having a variable length. For example, a complex subpattern such as "a.*cd[^\n] {0,10}.*y" may have "cd[^\n] {0,10}" as the subpattern selected, that may have a variable length of 2 to 12.

According to embodiments disclosed herein, subpattern selection may be based on at least one heuristic. A subpattern is a set of one or more consecutive elements from a pattern, wherein each element from the pattern may be represented by a node in a DFA or NFA graph, for purposes of matching bytes or characters from the payload. An element, as described above, may be a single text character represented by a node or a character class represented by a node. The compiler 306 may determine which subpatterns in the pattern are better suited for NFA based on whether or not a subpattern is likely to cause excessive DFA graph explosion, as described above in reference to FIGS. 2A-G. For example, generating a DFA from a subpattern including consecutive text characters would not result in DFA graph explosion, whereas complex subpatterns, as described above, may include operators as well as characters and, thus, may cause DFA graph explosion. For example, a subpattern including a wild card character or a larger character class repeated multiple times (e.g., [^\n]* or [^\n] {16}) may cause excessive states in a DFA and, thus, may be more advantageously suited for NFA. As such, the compiler 306 may be referred to herein as a "smart compiler."

As disclosed above, selecting a subpattern from each pattern in the set of one or more regular expressions 304 may be based on at least one heuristic. According to one embodiment, the at least one heuristic may include maximizing a number of unique subpatterns selected and length of each subpattern selected. For example, a pattern such as "ab.*cdef.*mn" may have multiple potential subpatterns, such as "ab.*," "cdef," and ".*mn". The compiler may select "cdef" as the subpattern for the pattern because it is a largest subpattern in the pattern "ab.*cdef.*mn" that is unlikely to cause DFA graph explosion. However, the compiler may select an alternate subpattern for the pattern "ab.*cdef.*mn" if the subpattern "cdef" has already been selected for another pattern. Alternatively, the compiler may replace the subpattern "cdef" with another subpattern for the other pattern, enabling the subpattern "cdef" to be selected for the pattern "ab.*cdef*mn."

As such, the compiler 306 may select subpatterns for the patterns 304 based on a context of possible subpatterns for each of the patterns 304, enabling maximization of the number of unique subpatterns selected and length of each subpattern selected. As such, the compiler 306 may generate a unified DFA 312 from the subpatterns selected 302 that minimizes a number of false positives (i.e., no match or partial match) in pattern matching of the at least one NFA 314 by increasing the probability of a pattern match in the at least one NFA 314.

By maximizing subpattern length, false positives in NFA processing may be avoided. False positives in NFA processing may result in non-deterministic run time processing and, thus, may reduce run time performance. Further, by maximizing a number of unique subpatterns selected, the compiler 306 enables a 1:1 transition between the unified DFA to the at least one NFA 314 generated from a pattern in the set given a match of a subpattern (from the pattern) in the unified DFA.

For example, if the subpattern selected was shared by multiple patterns, then a walker of the unified DFA would need to transition to multiple at least one NFAs because each at least one NFA is a per-pattern NFA, and the subpattern match from the unified DFA signifies a partial match for each of the multiple patterns. As such, maximizing the number of unique subpatterns reduces a number of DFA: NFA 1:N transitions, reducing run time processing by the walker 320.

To enable maximizing the number of unique subpatterns, the compiler 302 may compute a hash value 326 of the subpattern selected 318 and store the hash value computed 326 in association with an identifier (not shown) of a pattern 316 from which the subpattern 318 was selected. For example, the compiler 306 may, for each pattern in the set 304, compute a hash value of the subpattern selected. The hash values computed 324 may be stored in the at least one memory 104 as a table, or in any suitable manner. The hash method used may be any suitable hash method. The compiler may compare the hash value computed to a list of hash values of subpatterns selected for other patterns in the set, in order to determine whether or not the subpattern selected is unique.

If the hash value computed is found in the list, the compiler may determine whether to replace (i) the subpattern selected with another subpattern from the pattern or (ii) the subpattern selected for another pattern in the set with an alternate subpattern selected from the other pattern in the set. The other pattern in the set may be identified based on an association with the hash value computed in the list. The determination for whether to replace (i) or (ii) may be based on comparing lengths of subpatterns being considered for the replacement in order to maximize lengths of the unique subpatterns being selected, as described above. Replacing a subpattern selected may include selecting a next longest subpattern identified for a given pattern, or a next highest prioritized subpattern. For example, potential subpatterns may be prioritized based on likely of resulting in DFA explosion or a magnitude of the DFA explosion expected.

According to embodiments disclosed herein, the at least one heuristic may include identifying subpatterns of each pattern and disregarding a given subpattern of the subpatterns identified of each pattern, if the given subpattern has a length less than a minimum threshold. For example, to reduce false positives in the at least one NFA, the compiler may disregard subpatterns with lengths less than the minimum threshold because such subpatterns may result in higher probability of a false positive in the at least one NFA.

The at least one heuristic may include accessing a knowledge base (not shown) of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold. For example, application or protocol specific subpatterns may have a high frequency of use, such as for HyperText Transfer Protocol (HTTP) payloads, "carriage return line feed", or clear traffic such as multiple consecutive 0s from binary files, or any other frequently used subpattern.

The at least one heuristic may include identifying subpatterns of each pattern and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions. As disclosed above, maximizing length of the subpattern selected may enable higher probability of a match in the at least one NFA.

The at least one heuristic may include prioritizing given subpatterns of each pattern based on a subpattern type of each of the given subpatterns and lengths of the given subpatterns. The subpattern type may be text only, alternation, single character repetition, or multi-character repetition, and a priority order from highest to lowest for the subpattern type may be text only, alternation, single character repetition, and multi-character repetition. As such, subpatterns that are text strings having a length of at least a minimum length threshold may be prioritized higher than complex subpatterns of variable length.

The compiler 306 may prioritize a longer length subpattern over another subpattern of lesser length. The compiler 306 may select a unique subpattern as the subpattern selected, based on the prioritizing. As described above, the unique subpattern selected may have a length of at least a minimum length threshold.

The compiler 306 may select a non-unique subpattern as the subpattern selected, based on the prioritizing, if none of the given subpatterns are unique and have a length of at least the minimum length threshold. As such, the compiler 306 may select a subpattern from a pattern that is a duplicate of a subpattern selected from another pattern rather than select a subpattern having a length less than the minimum threshold. To facilitate finalizing of subpatterns, the compiler 306 may perform multiple passes over the patterns and sort possible subpatterns by length. As such, compiler subpattern selection for a given pattern in the set of one or more regular expressions 304 may be performed within a context of subpattern selection for other patterns in the set of one or more regular expressions 304.

As described above, the qualifiers 322 may indicate that reporting of a start offset is desired. However, the start offset may not be easily discernible. For example, finding a start offset in a payload matching patterns such as "a.*b" or "a.*d" may be difficult given a payload such as "axycamb" because two patterns may be matching, "axycamb" and "amb." As such, offsets for both instances of "a" in the payload may need to be tracked as potential start offsets. According to embodiments disclosed herein, potential start offsets need not be tracked, as the start offset is not determined until a match of the entire pattern is determined to have been found in a payload. Determining the match of the entire pattern may be found utilizing match results from the unified DFA, the at least one NFA, or a combination thereof.

According to embodiments disclosed herein, if a payload in the received packets 101 includes content that matches a subpattern selected 318 from a pattern 316, the walker may transition to walk at least one NFA for the pattern 318. The walker 320 may report a match of the subpattern selected 318 and an offset that identifies a location in the received packets of the last character of the matching subpattern as an end offset for the subpattern in the payload. A subpattern match may be a partial match for the pattern if the subpattern is a subset of the pattern. As such, the walker 320 may continue the search for the remainder of the pattern in the payload by walking at least one NFA for the pattern, in order to determine a final match for the pattern. It should be understood that the pattern may traverse one or more payloads in the received packets 101a.

Figure 3B:
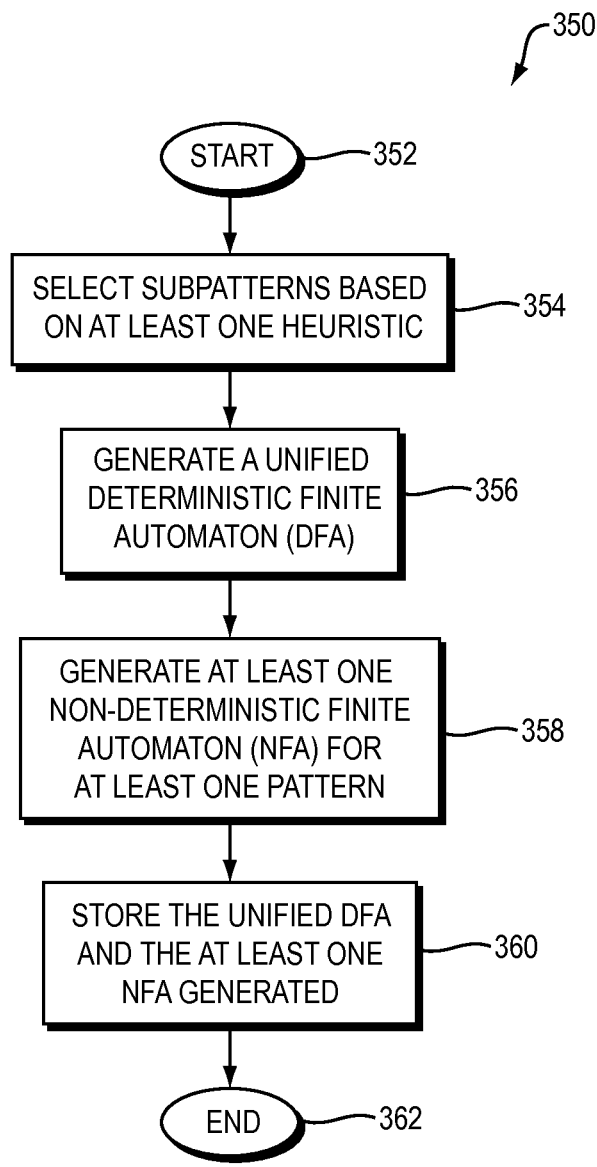
FIG. 3B is a flow diagram of an example embodiment of a method that may be implemented in at least one processor operatively coupled to at least one memory in a security appliance operatively coupled to a network.

FIG. 3B is a flow diagram (350) of an example embodiment of a method that may be implemented in at least one processor operatively coupled to at least one memory in a security appliance operatively coupled to a network. The method may begin (352) and select a subpattern from each pattern in a set of one or more regular expression patterns based on at least one heuristic (354). The method may generate a unified deterministic finite automaton (DFA) using the subpatterns selected from all patterns in the set (356). The method may generate at least one non-deterministic finite automaton (NFA) for at least one pattern in the set, a portion of the at least one pattern used for generating the at least one NFA, and at least one walk direction for run time processing of the at least one NFA, being determined based on whether a length of the subpattern selected is fixed or variable and a location of the subpattern selected within the at least one pattern (358). The method may store the unified DFA and the at least one NFA generated in the at least one memory (360). The method thereafter ends (362) in the example embodiment.

As disclosed above, the compiler 306 may generate the unified DFA 312 and the at least one NFA 314 to enable the walker 320 to search for matches of one or more regular expression patterns 304 in received packets 101a. The compiler 306 may select a subpattern from each pattern in the set of one or more regular expression patterns 304 based on at least one heuristic. The unified DFA 312 may be generated using the subpatterns selected 302 from all patterns in the set 304. The compiler 306 may generate at least one NFA 314 for at least one pattern 316 in the set 304. As such, the compiler 306 may be configured to compile the rule set 310 into the binary image 112 identifying portions from the rule set 310 that may be best suited for DFA or NFA processing. Thus, the binary image 112 may include at least two sections with a first section for DFA processing and a second section for NFA processing, such as the unified DFA 312 and the at least one NFA 314. As disclosed above, the binary image 112 may include compiled rules data for both DFA and NFA, or may be multiple binary images separating DFA compiled rules data from NFA compiled rules data. For example NFA compiled rules may be separated from DFA compiled rules and stored in a graph memory operatively coupled to the HNA 108. The memory 104 may be a graph memory that may be multiple memories, such as the graph memory 456, disclosed below with regard to FIG. 4.

Figure 4:
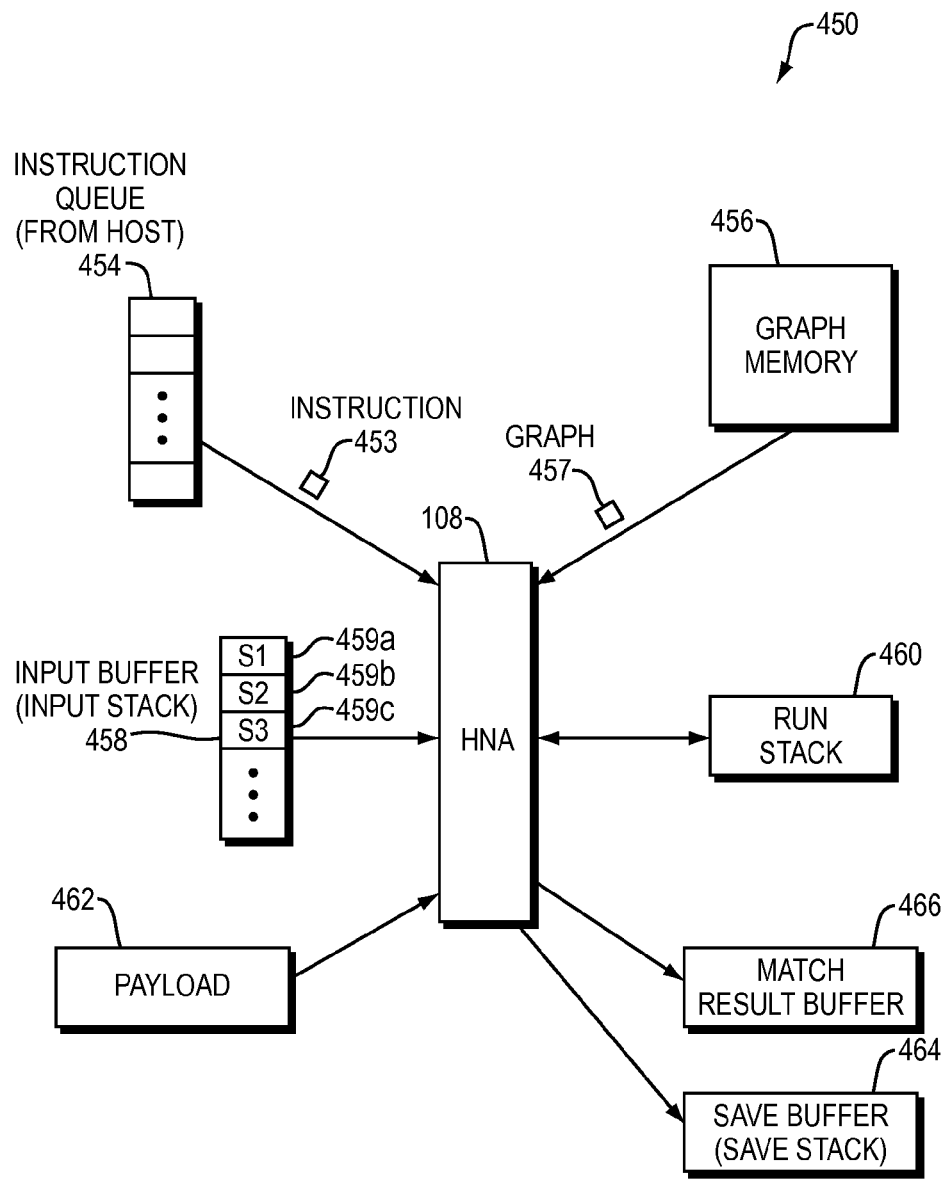
FIG. 4 is a block diagram of an example embodiment of an environment of a hyper non-deterministic automata (HNA) co-processor.

FIG. 4 is a block diagram 450 of an example embodiment of an environment of the HNA 108 of FIG. 1. According to embodiments disclosed herein, the HFA 110 may be configured to implement functionality of the walker 320 with reference to DFA processing and the HNA 108 may be configured to implement functionality of the walker 320 with reference to NFA processing.

According to embodiments disclosed herein, the HNA 108 may be configured to read the at least one instruction 453 from an instruction queue 454. The instruction queue 454 may be configured to store the at least one instruction 453 that may be sent by a host (not shown) to be processed by the HNA 108. The at least one instruction 453 may include at least one job, such as S1 459a, S2 459b, or S3 459c. Each at least one job may be determined based on partial match results identified by the HFA co-processor 110 of FIG. 1 for a given subpattern of the subpatterns 302 of FIG. 3A that is matching in the input stream.

A given job of the at least one job may indicate a given NFA of the at least one NFA 314, at least one given node of the given NFA, at least one given offset in a given payload, as well as at least one walk direction, each at least one walk direction corresponding to one node of the at least one given node. Each at least one job may include results of processing by the HFA, enabling the HNA to advance a match in the given NFA for a given pattern of the at least one pattern 304 that corresponds to the given subpattern. As such, each job represents partial match results determined by the HFA co-processor 110 in order to advance the match of the given pattern by the HNA co-processor 108.

The HNA 108 may process the at least one instruction 453 by reading at least one pointer (not shown), or other suitable instruction information, stored therein. The at least one pointer may include an input buffer pointer (not shown) to an input buffer 458. The at least one instruction 453 may also include a payload pointer (not shown) to a payload 462, a result buffer pointer (not shown) to a match result buffer 466, a save buffer pointer (not shown) to a save buffer 464, and a run stack pointer (not shown) to a run stack 460.

The input buffer 458, run stack 460, and the save buffer 464 may be referred to herein as an input stack, run stack, and save stack, respectively, although the input buffer 458, run stack 460, and save buffer 464 may or may not exhibit the Last In First Out (LIFO) properties of a stack. The input buffer 458, run stack 460, and save buffer 464 may be located within a same or different physical buffer. If located within the same physical buffer, entries of the input stack 458, run stack 460, and save stack 464 may be differentiated based on a field setting of the entries, or differentiated in any other suitable manner. The input stack 458 and the run stack 460 may be located in the same physical buffer that may be on-chip and the save buffer 464 may be located in another physical buffer that may be off-chip.

The at least one job, such as S1 459a, S2 459b, or S3 459c, of the at least one instruction 453, may be stored in the input stack 458 for processing by the HNA 108. The at least one job of the at least one instruction may each belong to a same given payload, such as the payload 462, that was processed by the HFA 110.

The HNA 108 may be configured to load (i.e., fetch or retrieve) at least one job from the input buffer 458, such as jobs S1 459a, S2 459b, or S3 459c, based on the input buffer pointer. The HNA 108 may push (i.e., store) the at least one job to the run stack 460. The HNA 108 may pop (i.e., read, fetch, load, etc.) a given job from the run stack, such as entry S1 459a, S2 459b, or S3 459c, and process the given job. Each at least one job (e.g., S1 459a, S2 459b, or S3 459c) may include a payload offset (not shown) to a segment (not shown) of the payload 462, and a pointer to a graph 457, that may be a given finite automaton of at least one finite automaton, such as the at least one NFA 314 of FIG. 3A.

The HNA 108 may load (i.e., fetch) the graph 457 from the graph memory 456 that may be included in the binary image 112 of FIG. 1 and FIG. 3A, and begin processing the graph 457 using payload segments corresponding with respective payload offsets of the payload 462. The graph memory 456 may be multiple memories. The graph memory 456 may be operatively coupled to the HFA 110 as well as the HNA 108. The HNA 108 may process the graph 457, by walking nodes of the graph 457 with payload segments. A partially matching path of the graph 457 may include at least two nodes of the graph 457 that match consecutive segments of the payload to a given pattern used to generate the graph 457. The partially matching path may be referred to herein as a thread or an active thread.

As the HNA 108 may process the graph 457 using payload segments from the payload 462, pushing and popping entries to/from the run stack 460 to save and resume its place in the graph 457. For example, the HNA 108 may need to save its place in the graph if a walked node presents multiple options for a next node to walk. For example, the HNA 108 may walk a node that presents multiple processing path options, such as a fork represented in the graph. According to embodiments disclosed herein, nodes of a DFA or NFA may be associated with a node type. Nodes associated with a split type may present multiple processing path options. The split node type is further disclosed below in reference to FIG. 5A.

According to embodiments disclosed herein, the HNA 108 may be configured to select a given path, of the multiple processing paths, and push an entry to the run stack 460 that may enable the HNA 108 to return and proceed along the unselected path, of the multiple processing paths, based on determining a mismatch (i.e., negative) result at walked node along the selected path. As such, pushing the entry on the run stack 460 may save a place in the graph 457 that represents unexplored context. The unexplored context may indicate a given node of the graph 457 and a corresponding payload offset to enable the HNA 108 to return to the given node and walk the given node with the given segment of the payload 462, as the given segment may be located at the corresponding payload offset in the payload 462. As such, the run stack 460 may be used to enable the engine to remember and later walk an unexplored path of the graph 457. Pushing or storing an entry that indicates a given node and a corresponding offset in a given payload may be referred to herein as storing unexplored context, thread or inactive thread. Popping, fetching, or loading an entry that indicates the given node and the corresponding offset in the given payload in order to walk the given node with a segment located at the corresponding offset in the given payload may be referred to herein as activating a thread. Discarding an entry that indicates the given node and the corresponding offset in the given payload may be referred to herein as flushing an entry or retiring a thread.

The run stack 460 may enable the HNA 108 to save its place in the graph 457 in an event that an end of the payload 462 is reached while walking segments of the payload 462 with the graph 457. For example, the HNA 108 may determine that the payload or a portion of the payload 462 is partially matching a given pattern and that a current payload offset of the payload 462 is an end offset of the payload 462. As such, the HNA 108 may determine that only a partial match of the given pattern was found and that the entire payload 462 was processed. As such, the HNA 108 may save the run stack 460 content to the save buffer 464 to continue a walk with a next payload corresponding to a same flow as the payload 462 that was processed. The save buffer 464 may be configured to store at least one run stack entry of the run stack 460, mirroring a running state of the run stack 460 in an event the entire payload 462 is processed.

Based on finding a final (i.e., entire or complete) match of the pattern, the HNA may pop and discard entries in the run stack 460 that are associated with the current job, for example the job loaded from the input buffer, such as S1 459a, and save match results (not shown) to the match results buffer 466. Alternatively, the HNA 108 may continue processing entries of the run stack 460 that are associated with the current job as all possible matching paths may be of interest.

The match results may include a node address associated with a node at which the final match of the pattern was determined. The node at which the final match of the pattern was determined may be referred to herein as a marked node. The node address, or other identifier of a final match location in the graph 457, identifier of the matching pattern, length of the matching pattern, or any other suitable match results or a combination thereof, may be included in the match results.

Based on processing all of the run stack entries associated with the current job, the HNA 108 may load a next job from the run stack that has been previously loaded from the input buffer 458 (e.g., S2 459b), as the HNA 108 may be configured to process jobs of the instruction 453 sequentially. As such, the HNA 108 may fetch a next graph (not shown) from the graph memory 456 walk the next graph with one or more payload segments from the payload 462 identified by the next job, and continue to process additional jobs until the run stack 460 is empty.

Based on finding a mismatch of the payload 462 while walking the graph 457 with the payload 462, the HNA 108 may pop an entry from the run stack 460 that is associated with the current job (e.g., S1 459a) and walk a next node with a next segment of the payload 462 based on content of the entry popped. If the run stack 460 does not include an entry associated with the current job, the HNA 108 may be done with the current job and may load a next job from the run stack 460 that has been previously loaded from the input buffer 458 (e.g., S2 459b). As such, the HNA 108 may be configured to walk a next graph based on the next job loaded, and continue to process additional jobs until the run stack 460 is empty.

Figure 5A:
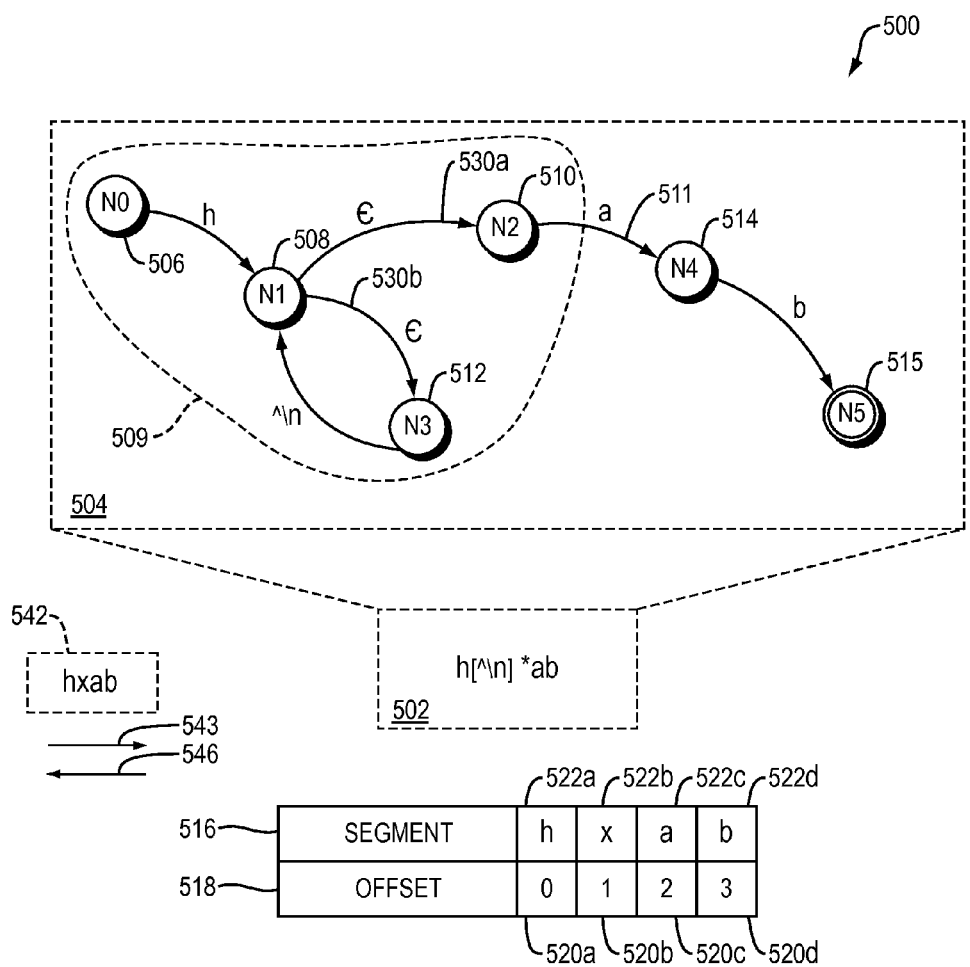
FIG. 5A is a block diagram of an example embodiment of a per-pattern non-deterministic finite automaton (NFA) graph that may be used by a walker to match a regular expression pattern in an input stream.

FIG. 5A is a block diagram 500 of an example embodiment of a per-pattern NFA graph 504 that may be used by the walker 320 to match a regular expression pattern 502 in an input stream (not shown). As disclosed above, the HNA 108 may be configured to implement functionality of the walker 320 with respect to NFA processing.

In the example embodiment, the input stream may include a packet (not shown) with a payload 542. The regular expression pattern 502 is a pattern "h[^\n]*ab" that specifies the character "h" followed by an unlimited number of consecutive characters not matching a newline character (i.e., [^\n]*). The unlimited number may be zero or more. The pattern 502 further includes the characters "a" and "b" consecutively following the unlimited number of characters not matching the newline character. In the example embodiment, the payload 542 includes segments 522a-d (i.e., h, x, a, and, b), with respective offsets 520a-d (i.e., 0, 1, 2, and 3) in the payload 542.

It should be understood that the regular expression pattern 502, NFA graph 504, payload 542, segments 522a-d, and offsets 520a-d represent examples used for illustrative purposes and that the system, methods, and corresponding apparatus disclosed herein may apply to any suitable regular expression pattern, NFA graph, payload, segments, and offsets. Further, it should be understood that the NFA graph 504 may be a sub-section of a larger NFA graph (not shown). In addition, the payload 542 may a portion of a larger payload (not shown) and the portion may be at the beginning, end, or any location of the larger payload, resulting in offsets different from those in the example embodiment.

In the example embodiment, the NFA graph 504 is a per-pattern NFA graph configured to match the regular expression pattern 502 to the input stream. For example, the NFA graph 504 may be a graph including a plurality of nodes generated by the compiler 306, such as nodes N0 506, N1 508, N2 510, N3 512, N4 514, and N5 515. The node N0 506 may represent a starting node for the pattern 502, and the node N5 515 may represent a marked node for the pattern 502. The marked node N5 515 may be associated with an indicator (not shown) that reflects a final (i.e., entire or complete) match of the pattern 502 matched to the input stream. As such, the walker 320 may determine that the pattern 502 is matching in the input stream based on traversing the marked node N5 515 and detecting the indicator. The indicator may be a flag or field setting of metadata (not shown) associated with the marked node or any other suitable indicator.

According to embodiments disclosed herein, the walker 320 may walk the segments 522a-d of the payload 542 one segment at a time through the NFA graph 504 to match the regular expression pattern 502 to the input stream. A given segment of the segments 516 for walking a given node may be determined based on its respective offset of the offsets 518 being a current offset within the payload 542. According to embodiments disclosed herein, the walker 320 may update the current offset by incrementing or decrement the current offset. For example, the walker 320 may walk the NFA graph 504 in a forward or reverse direction, and, thus, may walk segments from the payload 542 in a forward 543 or a reverse 546 direction, by respectively incrementing or decrementing the current offset.

The nodes N0 506, N2 510, N3 512, and N4 514, may be configured to match a respective element to a given segment of the payload 542, whereas nodes N1 508 and N5 515 may be nodes of a node type indicating no matching functionality, and, thus, would not process from the payload 542. In the example embodiment, the node N1 508 is a split node presenting multiple transition path options to the walker 320. For example, walking the split node N1 508 presents epsilon paths 530a and 530b. According to embodiments disclosed herein, the walker 320 may select a given path of the multiple paths 530a and 530b based on an implicit setting that is in mutual agreement with the walker 306. For example, the compiler 306 may generate the NFA graph 504 based on an implicit understanding that the walker 320 follows a deterministic path, for example, with the implicit understand that the walker 320 selects an upper epsilon path 530a based on walking the split node N1 508. According to embodiments disclosed herein, the upper epsilon path 530a may be selected as the upper epsilon path 530a represents a lazy path. The lazy path may be the path representing the shortest possible match of elements.

According to embodiments disclosed herein, the split node N1 508 may be associated with split node metadata (not shown) to present the multiple path options. For example, the split node metadata may indicate, either directly or indirectly, multiple next nodes, such as the nodes N2 510 and N3 512, in the example embodiment. If the multiple next nodes are indicated directly, the metadata may include absolute addresses or pointers to the next nodes N2 510 and N3 512. If the multiple next nodes are indicated indirectly, the metadata may include indices or offsets that may be used to resolve absolute addresses of the next nodes N2 510 and N3 512 or pointers to the next nodes N2 510 and N3 512. Alternatively, other suitable forms for directly or indirectly indicating next node addresses of the multiple next nodes may be used.

The implicit understanding may include configuring the walker 320 to select a given next node of multiple next nodes based on node metadata included in a particular entry location within the split node metadata. The compiler 306 may be configured to generate the split node metadata including an indication of the given next node at the designated entry location. As such, the implicit understanding that a given path, such as the upper epsilon path 530a, will be selected by the walker 320 at the split node N1 508 may be used by the compiler 306 generating the NFA graph 504.

FIG. 5B is a table 538 of an example embodiment of processing cycles for walking the per-pattern NFA graph of FIG. 5A with a payload 542. It should be understood that a processing cycle may include one or more clock cycles.

As shown in the table 538, the processing cycles 540a-h may include walking a current node 530 with a segment from the payload 542 at a current offset 532 to determine a match result 534 and walker action 536 based on the match result 534. In the example embodiment, the node N0 506 may have a character node type. For example, the node N0 506 may be a character node that is configured to match the character "h" in the input stream. In the example embodiment, the walker 320 may walk the starting node N0 506 with the segment 522a (i.e., "h") at the current offset 520a in the processing cycle 540a.

The walker 320 may determine that the match result 534 is a positive match result as the segment 522a matches character "h" at the node N0 506. As specified by the compiler 306 via metadata (not shown) associated with the starting node N0 506, the walker 320 may walk in a forward direction and fetch the next node indicated by the metadata associated with the node N0 506 and may increment the current offset from 520a (i.e., "0") to 520b (i.e., "1"). The next node indicated by the node N0 506 is the split node N1 508 in the example embodiment. As such, the walker 320 takes the action 536 for the processing cycle 540a that includes updating the current offset to "1" in the payload 542 and transitioning to the split node N1 508. Transitioning may include fetching (also referred to herein as loading) the split node N1 508.

As the split node N1 508 presents multiple transition path options, such as the epsilon paths 530a and 530b, the action 536 for the processing cycle 540b may include selecting the upper epsilon path 530a and fetching the node N2 510 independent of the payload 542 and without consuming (i.e., processing) from the payload 542. Since no matching function is performed by the split node N1 508, the current offset/segment 532 are unchanged, and, thus, payload is not consumed (i.e., processed) for the processing cycle 540b.

Since the split node N1 508 presents multiple path options, the action 536 may include storing unexplored context, such as by storing an indirect or direct identifier of the node N3 512 and the current offset 520b (i.e., "1"). The selected transition path may be referred to herein as the current or active thread and each untraversed transition path that is stored may be referred to herein as a stored thread. Each thread may be identified by a corresponding node identifier and offset in a payload. As such, the unexplored context may identify an unexplored thread (i.e., path).

Storing the unexplored context may enable the walker 320 to remember to return to the node N3 512 to walk the node N3 512 with the segment "1" at the offset 520b in the payload 542 in an event a negative match result occurs along the selected partially matching path, for example, if the negative match result is determined at the node N2 510 or nodes along a path extending from the node N2 510. According to embodiments disclosed herein, the unexplored context may be marked with a Discard Unexplored Processing (DUP) indicator that indicates to the walker 320 whether to discard or process the unexplored context in an event a final match for the pattern 502 is identified along the selected transition path.

For example, based on reaching the marked node N5 515 that indicates the final (i.e., complete or entire) match for the pattern 502 in the input stream, the walker 320 may utilize the DUP indicator to determine whether to process the unexplored context by walking the node N3 512 with the segment "x" at the offset 520b in an effort to determine another path of the NFA graph 504 that matches the pattern 502, or whether to discard the unexplored context. Marking the unexplored context with the DUP indicator may include marking the unexplored context in any suitable manner, such as by setting a bit or field associated with the unexplored context to true, to signify desired processing of the stack entry, or false to signify a desired discard of the stack entry.

Whether or not a stored thread is traversed may be determined by the compiler 306. For example, the compiler 306 may control whether or not the DUP indicator is set by configuring a setting in corresponding metadata for each node. Alternatively, the compiler 306 may configure a global setting included in global metadata associated with the finite automata, specifying that all stored threads are to be traversed, enabling all possible matches to be identified.

In the example embodiment, the selection of the epsilon transition path 530a may result in detecting a match failure at the node N2 510 or at a subsequent node, such as N4 514, of the current thread. As such, if a match failure is detected, the stored thread for the epsilon transition path 530b may then be traversed. Alternatively, if specified by the compiler 306, the epsilon transition path 530b may be traversed regardless of whether or not traversing the epsilon transition path 530b results detection of a match failure.

Storing the untraversed transition path may include pushing an entry on a stack, such as the run stack 460 of FIG. 4, by storing an identifier of the next node N3 513 in association with an indication of the current offset 520b in the entry. The identifier of the next node N3 513 may be a value, pointer, or any other suitable indicator of the next node. The value of the offset may be a numeric value, pointer, or any other suitable value identifying locations of segments 516 within the payload 542.

According to the example embodiment, based on selecting the upper path (i.e., the epsilon transition path 530*a*) the walker 320 may fetch node the N2 510 and try to match the segment 522*b* (i.e., "x") at the current offset 520*b* (i.e., "1") to the element "a" of the node N2 510 in the processing cycle 540*c*. Since "x" does not match element "a" at the node N2 510, the action 536 for the processing cycle 540*c* may include popping an entry from the run stack 460. The entry popped 544*b* may be a most recently popped entry, such as a stored entry 544*a* indicating the node N3 512 and offset 520*b* (i.e., "1") in the example embodiment.

The walker 320 may transition and walk the node N3 512 and with the segment "x" located at the offset 520*b* in the payload 542. As such, the processing cycle 540*d* shows the match result 534 is positive for processing cycle 540*d*. The action 536 for the processing cycle 540*d* may include updating the current offset to the offset 520*c* and transitioning back to the split node N1 508 that may be a next node indicated by the node N3 512.

Since all arcs transitioning from the split node N1 508 are epsilon transitions, the walker 320 may again select a path of the multiple path options and does not consume (i.e., process) a segment from the payload 542 as the current offset is not updated for the processing cycle 540*e*. In the example embodiment, the walker 320 again selects the epsilon transition path 530*a*. As such, the walker 320 again stores a thread by pushing node N3 512 and the current offset, now 520*c* (i.e., "2"), on the run stack 460. As shown for processing cycle 540*f*, the walker 320 fetches node N2 510 and matches the segment 522*c* (i.e., "a") at offset 520*c* (i.e., "2") to the element "a" of the node N2 510. Since "a" matches at the node N2 510, the walker 320 updates the current offset to 520*d* (i.e., "3") and transitions to the node N4 514 that is specified by the node N2 510 metadata (not shown) as configured by the compiler 306. For example, N2 510 metadata may specifying a transition 511 from a given node such as the node N2 510 to a next node such as the node N4 514 via a next node address (not shown) associated with the given node N2 510. According to embodiments disclosed herein, the next node address may be configured to identify the next node and a given memory of the plurality of memories 456 to which the compiler 306 distributes the next node for storing.

As such, for the processing cycle 540*g*, the walker 320 may fetch the next node N4 514 and the next segment 522*d* (i.e., "b") at the offset 520*d*. Since "b" matches at the node N4 514, the walker 320 may transition to the next node N5 515. The node N5 515 is a marked node associated with an indicator signifying a final (i.e., complete or entire) match of the regular expression pattern 502 in the input stream. Thus, for the processing cycle 540*h* the walker 320 may discontinue the walk along the current path and report the final match by storing an entry in the match result buffer 466. The walker 320 may then check the run stack 460 for stored threads and either discard the stored threads or activate them as indicated by the corresponding DUP indicator. As such, the walker 320 pops the entry that identifies the node N3 512 and the offset 520 (i.e., "2"), and determines whether to activate the stored thread by walking the node N3 512 with the segment 522*c* at the offset 520*c* or discard the stored thread according to the DUP indicator associated with the popped entry.

Embodiments disclosed herein may enable optimized match performance due to the combined DFA and NFA type processing disclosed above. For example, embodiments disclosed above may reduce a number of false positives in NFA processing as the NFA processing may be based on partial matches identified via the DFA processing. Further, because embodiments disclosed herein include per-rule (i.e., per-pattern) NFAs that may be identified by the DFA processing, embodiments disclosed herein further optimize match performance.

As disclosed above, the DFA 312 is a unified DFA and each at least one NFA 314 is a per-pattern NFA. Walking payload through the unified DFA 312 by the HFA 110 may be considered a first parsing block that marks starting points of patterns (intermediate matches) and provides the starting point to the at least one NFA 314 that may continue the walk from the mark to determine a final match. For example, based on the partial match results determined by processing segments of payloads of an input stream through the unified DFA 312, the walker 320 may determine that a given number of rules (i.e. patterns) of the rule set 310 need to be processed further, and the HFA 110 may produce pattern match results that may be converted into the given number of NFA walks as each at least one NFA 314 is a per-pattern NFA.

Figure 6:
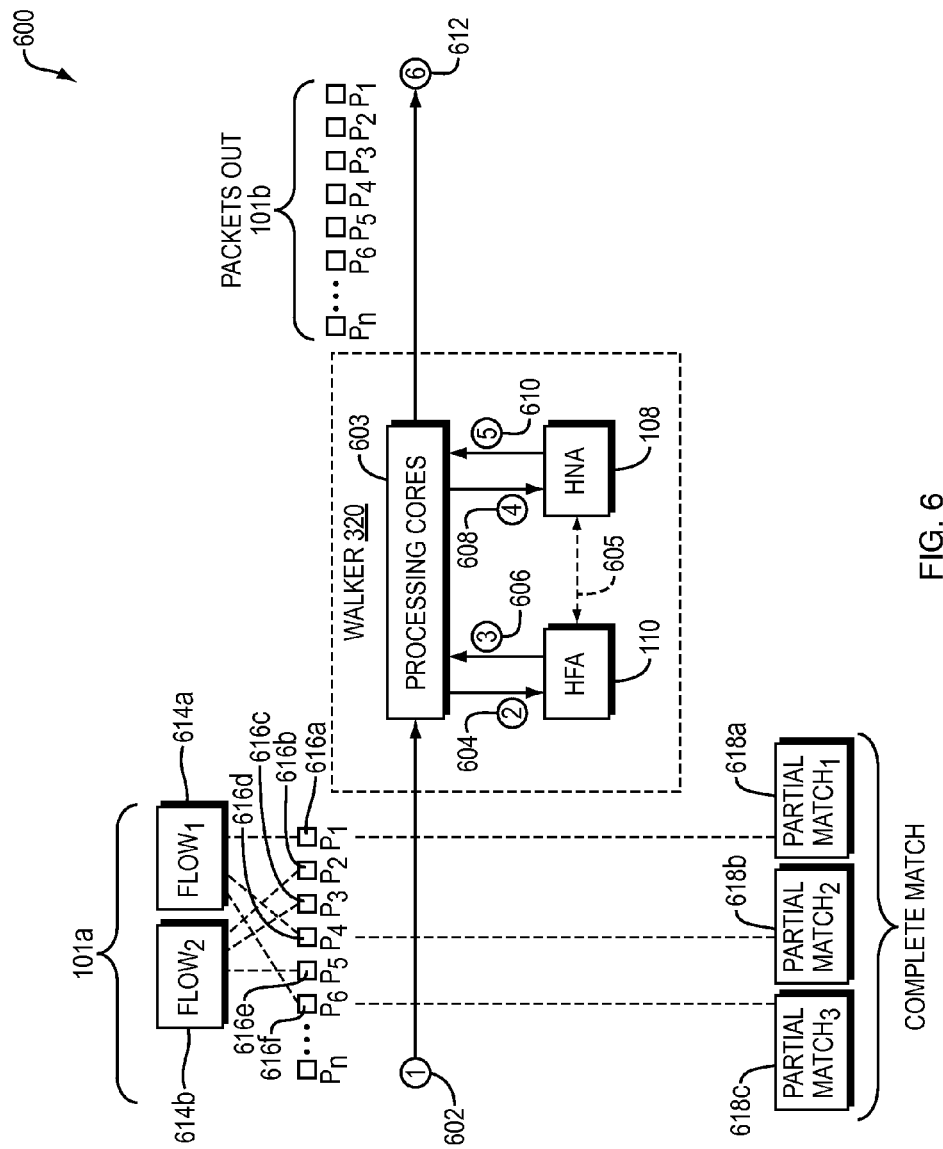
FIG. 6 is a block diagram of an example embodiment of an environment for the walker.

FIG. 6 is a block diagram 600 of an example embodiment of an environment 600 for the walker 320. An input stream of packets 101*a* may be received 602 and may include packets 616*a-f* that may be packets from different flows, such as a first flow 614*a* and a second flow 614*b*. For example, packets P1 616*a*, P4 616*d*, and P6 616*f* may be packets in the first flow 614*a* whereas packets P2 616*b*, P3 616*c*, and P5 616*e* may belong to the second flow 614*b*. The processing cores 603 may be general purpose processing cores of the security appliance 102, as disclosed above with reference to FIG. 1, that may be configured to perform higher level protocol processing of the packets 101*a* and may be configured to offload the pattern matching methods to the HFA 110 and HNA 108.

The packets 101*a* may be forwarded 604 to the HFA 110 and the walker 320 may walk segments of the packets 101*a* through the unified DFA, such as the unified DFA 312 of FIG. 3A, to determine partial matches of the regular expression patterns 304 in the input stream. The walker 320 may be configured to forward 606 results of the partial matches that may identify offsets of segments of the packets 101*a* and nodes of per-pattern NFAs, such as the at least one NFA 314, to progress the partial matches by the HNA 108 that may walk the at least one NFA 314 based on the partial match results of the DFA processing of the HFA 110, as the partial match results may be forwarded 608 to the HNA 108 with corresponding packets of the packets 101*a*.

The HNA 108 may enable a determination that partial matches 618*c*, 618*b*, and 618*a*, form a final (i.e., complete) match to a given regular expression pattern of the regular expression patterns 304 in the input stream. For example, by forwarding 606 the HFA partial match results from the HFA 110 to the HNA 108, either indirectly via the processing cores 603, or directly 605 from the HFA 110, each packet partially matched by the HFA 110 may enable the HNA 108 to advance the partial match as the walker 320 may walk segments of the packets 101*a* through the at least one NFA 314, with "hints" or starting information from the HFA 110.

For example, as disclosed above with regard to FIG. 4, the input stack 458 may include at least one job, such as S1 459*a*, S2 459*b*, or S3 459*c*, of the at least one instruction 453, for processing by the HNA 108. The at least one job of the at least one instruction may each belong to a same given payload, such as the payload 462, that was processed by the HFA 110. Such "hints" or starting information that may be based on packet "pre-screening" by the HFA 110 may include NFA starting nodes with corresponding offsets of payload segments for walking with a per-pattern NFA, as disclosed above. As such, the walker 320 may determine final match results 610 for packets 101a that may be forwarded to the processing cores 603 from the HNA 108 and the packets 101a may then be forwarded 612 as appropriate as the packets 101b in the network.

In addition to such pre-screening of packets by the HFA 110 that may reduce a number of false positives for NFA processing, embodiments disclosed herein may further optimize match performance by distributing nodes of each per-pattern NFA to memories in a memory hierarchy based on node locality. Since each NFA may be a per-pattern NFA, embodiments disclosed herein may advantageously distribute nodes of each per-pattern NFA to memories in a hierarchy based on an understanding that the longer the rule (i.e., pattern) the less likely it is that nodes generated from portions at the end of the rule (i.e., pattern) are to be accessed (i.e., walked or traversed). By storing earlier nodes of each of the per-pattern NFA in relatively faster (i.e., higher performance) memories, embodiments disclosed herein may further optimize match performance. It should be understood that because such node distribution may be based on a hierarchical level to memory mapping, nodes may be advantageously distributed based on the hierarchical levels mapped, enabling any suitable distribution that optimizes match performance to be utilized.

As disclosed above, the at least one NFA 314, such as the per-pattern NFA 504 of FIG. 5A, may be stored in at least one memory, such as the memory 104 of FIG. 1 or the graph memory 456 of FIG. 4. According to embodiments disclosed herein, match performance of the walker 320 may be optimized based on the smart compiler 306 advantageously distributing nodes of the per-pattern NFA 504 across the at least one memory 456 that may include multiple graph memories in a memory hierarchy.

For example, match performance of the walker 320 may be optimized based on storing consecutive nodes, such as the nodes N0 506, N1 508, N2 510, and N3 512, of the section 509 of the per-pattern NFA 504 of FIG. 5A, in a faster performance memory mapped to a higher hierarchical level relative to another memory that may be mapped to a lower hierarchical level in the memory hierarchy that stores the consecutive nodes N4 514 and N5 515. Since the NFA 504 is a per-pattern NFA generated from a single pattern, such as the pattern 502, the NFA 504 is separate from other NFAs generated for other patterns, and, thus, embodiments disclosed herein may be based on a recognized locality of nodes of the per-pattern NFA not present in for nodes of a unified NFA.

Embodiments disclosed herein may be based on an understanding that earlier nodes of a per-pattern NFA graph, such as the per-pattern NFA graph 504, such as the nodes N0 506, N1 508, N2 510 and N3 512, may have a higher likelihood of being traversed than the nodes N4 514 and N5 515 because the nodes N4 514 and N5 515 are located towards the end of the rule (i.e. pattern) 502, and thus, require that more of the payload be matched in order to be walked (i.e. traversed). As such, earlier nodes of a per-pattern NFA, such as the NFA 504, or any other suitable per-pattern NFA graph, may be considered to be "high touch" nodes that may be accessed on a more frequent basis due to false positives than "low touch" nodes that are more likely only to be accessed in an event a complete match of the pattern occurs.

According to embodiments disclosed herein, the compiler 306 may distribute nodes of each per-pattern NFA to memories in a hierarchy based on the understanding of which nodes in each per-pattern NFA are considered "high touch" nodes and which are considered to be "low touch" nodes. Such an understanding may be used to "pre-cache" (i.e., statically store) nodes of each per-pattern NFA by distributing the nodes to memories in a memory hierarchy enabling an improved match performance. For example, "high touch" nodes may be distributed to faster memories based on the understanding that the "high touch" nodes will be accessed (i.e., walked or traversed) more frequently due to their locality within the per-pattern NFA.

In general, regular expression access patterns of a unified NFA, generated based on a set of regular expression patterns, may be random as such access patterns may be based on the particular payload. Thus, a history of regular expression access patterns cannot be used to predict further regular expression access patterns. For example, caching a most recently traversed node of a unified NFA may provide no performance benefit to a walker because a next node accessed within the unified NFA may not be the cached node.

Figure 7:
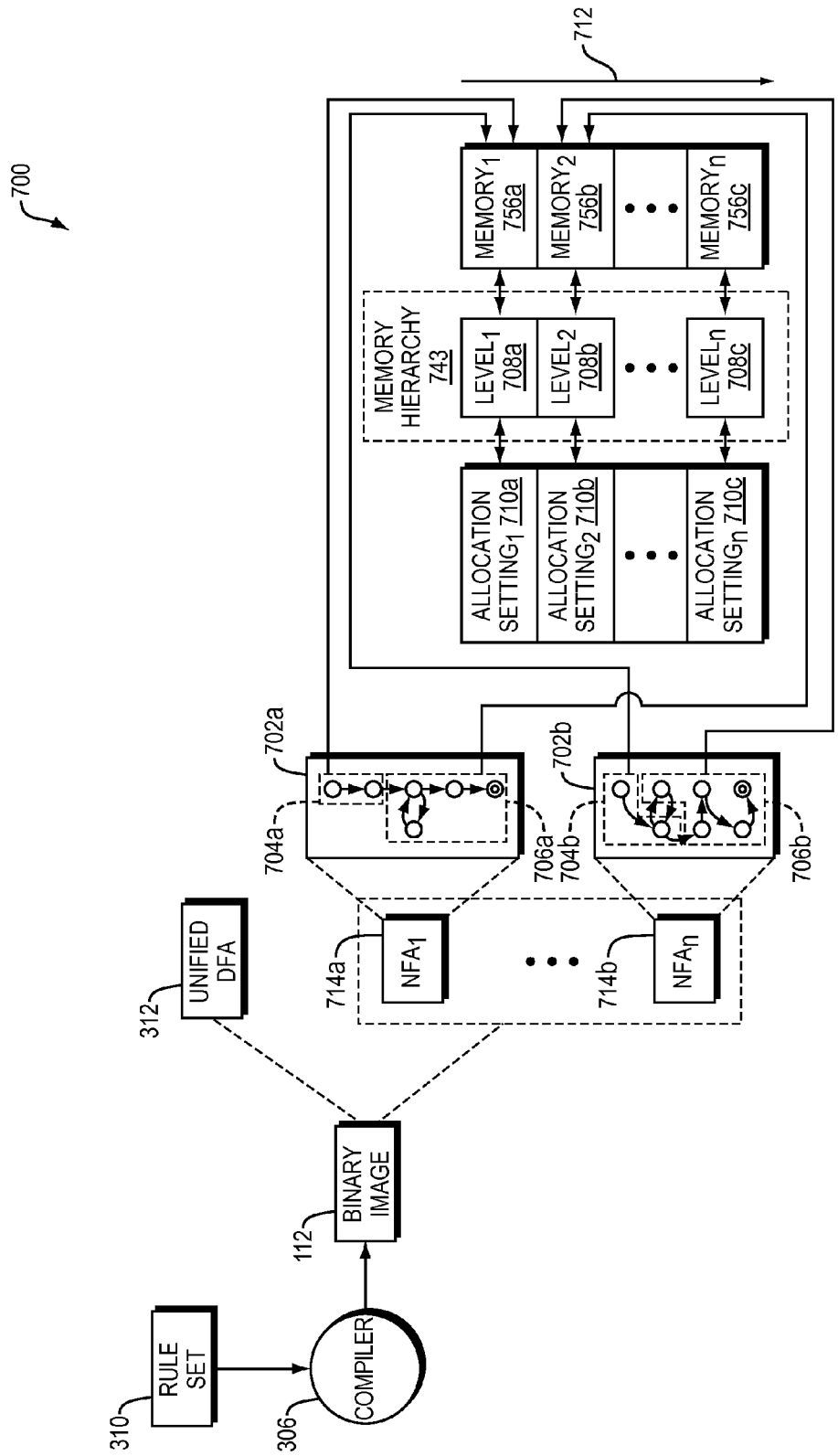
FIG. 7 is a block diagram of an example embodiment of an environment for the compiler.

FIG. 7 is a block diagram of an embodiment of an environment 700 for the compiler 306. As disclosed above, the compiler 306 may be referred to herein as a smart compiler that may be configured to compile the rule set 310 into the binary image 112 by identifying portions of the rule set 310 that may be best suited for DFA or NFA processing. Thus, the binary image 112 may include at least two sections with a first section for DFA processing and a second section for NFA processing, such as the unified DFA 312 and the at least one NFA 314, as disclosed above with regard to FIG. 3A. According to embodiments disclosed herein, the HNA 108 may be operatively coupled to multiple memories that may include the graph memories 456 as disclosed above with regard to FIG. 4. According to embodiments disclosed herein, the compiler 306 may be configured to determine placement of nodes of the unified DFA 312 and the at least one NFA 314 in the graph memories 456.

According to embodiments disclosed herein, the unified DFA 312 may be statically stored in a given memory of the graph memories 456 whereas at least one NFA 314 may have nodes distributed and statically stored across the graph memories 456 as the compiler 306 may target distributions of particular NFA nodes for storing in particular memories for optimizing walker match performance. According to embodiments disclosed herein the graph memories 456 may be in a memory hierarchy 743 that may include a plurality of hierarchical levels 708a-c. The plurality of hierarchical levels 708a-c may be mapped to the multiple graph memories 456 that may include memories 756a-c.

The compiler 306 may map the hierarchical levels 708a-c in any suitable manner and the hierarchical levels 708a-c may be ranked in descending order 712 such that the level 708a may be a highest ranked level 708a and the level 708c may be a lowest ranked level. The graph memories 756a-c may include a random access memory (RAM) that may be a highest performance memory that may be co-located with an on-chip search memory (OSM) on the network services processor 100. The graph memories 756a-c may include a system memory that may be external and operatively coupled to the network services processor 100.

The RAM memory may be mapped to the highest ranked level 708a, the OSM may be mapped to the next highest ranked level 708b, and the system memory may be mapped to the lowest ranked level 708c, based on a mapping according to performance (i.e., read and write access times) of the memories. However, it should be understood that a mapping between the plurality of hierarchical levels 708a-c and the graph memories 756a-c may be made in any suitable manner. For example, the mapping may be based on an understanding of an application associated with the rule set 310 from which the nodes being distributed to the memories 756a-c may be generated, thus, a highest performance memory may not be mapped to a highest ranked hierarchical level. Further, it should be understood that a number of hierarchical levels in the memory hierarchy 743 and a number of graph memories 756a-c shown are for illustrative purposes and may be any suitable number of hierarchical levels and memories.

As disclosed above, locality of nodes of a per-pattern NFA may be taken advantage of by the smart compiler 306 by storing NFA nodes generated from earlier portions of a given pattern in faster memories. Further, since the probability of a match of the given pattern is already higher since a partial match of the given pattern was determined by the DFA processing of the HFA 110, such embodiments combine to optimize match performance.

For example, as disclosed above, DFA processing may be used to reduce a number of false positives found by NFA processing. Since each NFA may be per-pattern NFA, nodes of each per-pattern NFA may be advantageously distributed across a plurality of memories based on a mapping of the plurality of memories to hierarchical levels of the memory hierarchy 743. For example, smaller NFAs generated from relatively shorter length patterns may have all nodes distributed to a first level and stored in a first memory that is mapped to the first level, whereas larger NFAs generated from relatively longer patterns may have a first portion of nodes distributed to the first level and remaining portions distributed amongst remaining levels. The first level may be a highest ranked level that is mapped to a highest performance memory.

As such, earlier nodes of the per-pattern NFAs may be stored in the highest performance memory. Since earlier nodes may have a higher likelihood of being traversed due to a false positive, embodiments disclosed herein may enable a majority of false positives to be handled via accesses to memories mapped to higher levels in the memory hierarchy 743. According to embodiments disclosed herein, match performance may be optimized by enabling a number of accesses to the memory 756a that is mapped to a highest ranked hierarchical level, such as the hierarchical level 708a in the memory hierarchy 743, to be relatively higher than a number of accesses to the memory 756c that may be mapped to the lowest ranked hierarchical level 708c.

The memory 756a may be a highest performance memory that enables, for example, 1300 million transactions per second, whereas the memory 756b may be of lesser performance that enables 150 million transactions per second, and the memory 756c may be a least performance memory that enables 12 million transactions per second. Further, according to embodiments disclosed herein, an amount of memory of such higher performance memories mapped to higher ranked hierarchical levels may be relatively smaller in size than lower performance memories, such as the memory 756c, that is mapped to a lowest ranked hierarchical level 708c, that may be a relatively large memory in comparison. For example, the memory 756c may be a system memory that is external and provides a relatively large amount of storage capacity limited by an amount of physically attached memory.

According to embodiments disclosed herein, per-pattern NFA storage allocation settings 710a-c may be configured for the hierarchical levels 708a-c. The per-pattern NFA storage allocation settings 710a-c may denote a target number of unique nodes for distributing from each per-pattern NFA to a respective hierarchical level of the hierarchical levels 708a-c for storing in a given memory mapped to the respective hierarchical level. The compiler 306 may be configured to determine the per-pattern NFA allocation settings 710a-c in a manner that enables the memories 756a-c mapped to the hierarchical levels 708a-c to provide sufficient storage capacity in an event a per-pattern NFA is generated for each of the one or more patterns in the rule set 310.

The per-pattern NFA storage allocation settings 710a-c may denote a target number of unique nodes, of the respective set of nodes of each per-pattern NFA, for distributing to at a respective hierarchical level for storing to a given memory mapped to the respective hierarchical level. For example, based on the per-pattern NFA storage allocation setting 710a that is configured for the hierarchical level 708a, the compiler 306 may distribute a first portion 704a of the respective set of nodes 702a of the per-pattern NFA 714a and a second portion 704b of the respective set of nodes 702b of the per-pattern NFA 714b for storing in the memory 756a that is mapped to the hierarchical level 708a.

Based on the per-pattern NFA storage allocation setting 710b that is configured for the hierarchical level 708b, the compiler 306 may distribute a third portion 706a of the respective set of nodes 702a of the per-pattern NFA 714a and a fourth portion 706b of the respective set of nodes 702b of the per-pattern NFA 714b for storing in the memory 756b that is mapped to the hierarchical level 708b. Such distributions are target distributions as a number of nodes of a given respective set of nodes may not include the target number as fewer than the target number may have been generated or fewer than the target number may remain in a respective set for distribution.

In the example embodiment, the per-pattern NFA storage allocation setting 710c may be configured for the lowest ranked level 708c of the memory hierarchy 743 and may be specified in a manner that denotes an infinite number. The memory 756c that is mapped to the lowest ranked hierarchical level 708c in the example embodiment, may be a system memory that has a relatively large amount of storage. As such, the compiler 306 may distribute nodes to the system memory including distributing any remaining undistributed nodes of each respective set of nodes generated for each of the per-pattern NFAs 714a-b for storing in the system memory 756c.

It should be understood that the hierarchical level to memory mapping may be inherently understood by the compiler and, as such, may obviate the specific hierarchical levels 708a-c. For example, the compiler 306 may configure the per-NFA storage allocations settings 710a-c and map the settings directly to the memories 756a-c based on an inherent understanding of the hierarchical level mapping of each of the memories 756a-c in the memory hierarchy 743. It should also be understood that a number of per-pattern NFAs, nodes of the per-pattern NFAs, and distributions shown in FIG. 7 are for illustrative purposes and may be any suitable number of per-pattern NFAs, nodes, or distributions.

Figure 8:
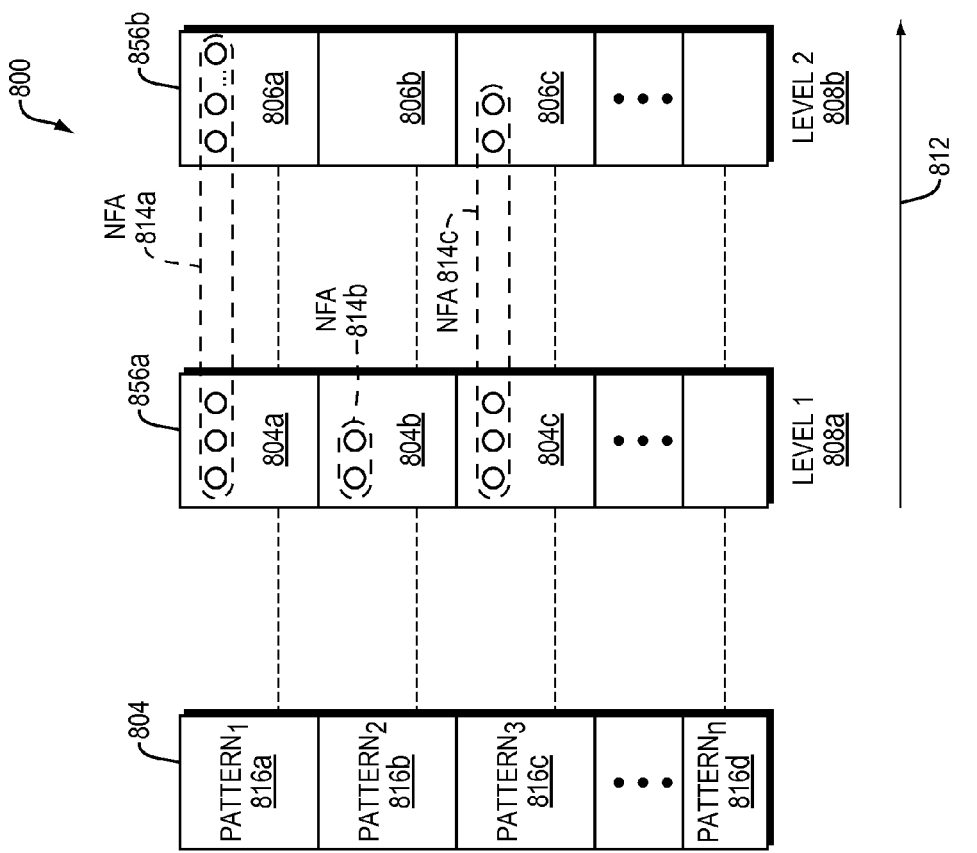
FIG. 8 is a block diagram of an example embodiment of node distributions for multiple per-pattern NFAs.

FIG. 8 is a block diagram 800 of an example embodiment of node distributions for multiple per-pattern NFAs. In the example embodiment, a first NFA 814a is generated for a pattern 816a of one or more patterns 804, a second NFA 814b is generated for a second pattern 816b of the one or more patterns 804, and a third NFA 814*c* is generated for a third pattern 816*c* of the one or more patterns 804.

A first portion of nodes 804*a* of the first per-pattern NFA 814*a* is distributed to a hierarchical level 808*a* that is mapped to a first memory 856*a* in a memory hierarchy 812 and a second portion of nodes 806*a* is distributed to a second hierarchical level 808*b* that is mapped to a second memory 856*b*. In the example embodiment, the hierarchical level 808*a* is a highest ranked level and the hierarchical level 808*b* is a lowest ranked hierarchical level. A third portion of nodes 804*b* of a second per-pattern NFA 814*b* is distributed to the hierarchical level 808*a* that is mapped to the first memory 856*a* in the memory hierarchy 812 and a fourth portion of nodes 806*b* is distributed to the second hierarchical level 808*b* that is mapped to the second memory 856*b*. A fifth portion of nodes 804*c* of a third per-pattern NFA 814*c* is distributed to the hierarchical level 808*a* that is mapped to the first memory 856*a* in the memory hierarchy 812 and a sixth portion of nodes 806*c* is distributed to the second hierarchical level 808*b* that is mapped to the second memory 856*b*.

As shown in FIG. 8, the second portion of nodes 804*b* of the second NFA 814*b* distributed for storing in the memory 856*a* mapped to the hierarchical level 808*a* may be less than the first portion of nodes 804*a* and the fifth portion of nodes 804*c* of the first NFA 814*a* and the third NFA 814*c*, respectively. Such may be the case, for example, if a number of nodes of the per-pattern NFA 814*b* is less than a number of unique target nodes denoted by a per-NFA storage allocation setting (not shown) for the hierarchical level 808*a*. Further, as the hierarchical level 808*b* is a the lowest ranked hierarchical level in the memory hierarchy 812, a next per-pattern NFA storage allocation setting (not shown) for the hierarchical level 808*b* may be very large, enabling all undistributed nodes to be distributed for storing in the memory 856*a* that is mapped to the hierarchical level 808*b*, after distributions have been made to each hierarchical level that is higher than the hierarchical level 808*b*. As such, in the example embodiment, the second node portion 806*a* may include more nodes than the sixth portion 806*c* as the pattern 816*a* may be a longer rule than the pattern 816*c*. Further, the fourth node portion 806*b* may be null as the pattern 816*b* may be relatively short with few nodes generated for the per-pattern NFA 814*b* resulting in all nodes of the per-pattern NFA 814*b* being distributed to the hierarchical level 808*a* for storing in the memory 856*a*.

The compiler 306 may distribute node of each per-pattern NFA as part of generating each per-pattern NFA. As disclosed above, transition in the NFA from a first node to a second node may be specified via first node metadata that identifies the second node via a next node address. According to embodiments disclosed herein, the next node address may be configured by the compiler 306 to include a portion that indicates a given memory of the plurality of memories to which the second node has been distributed for storing.

Figure 9:
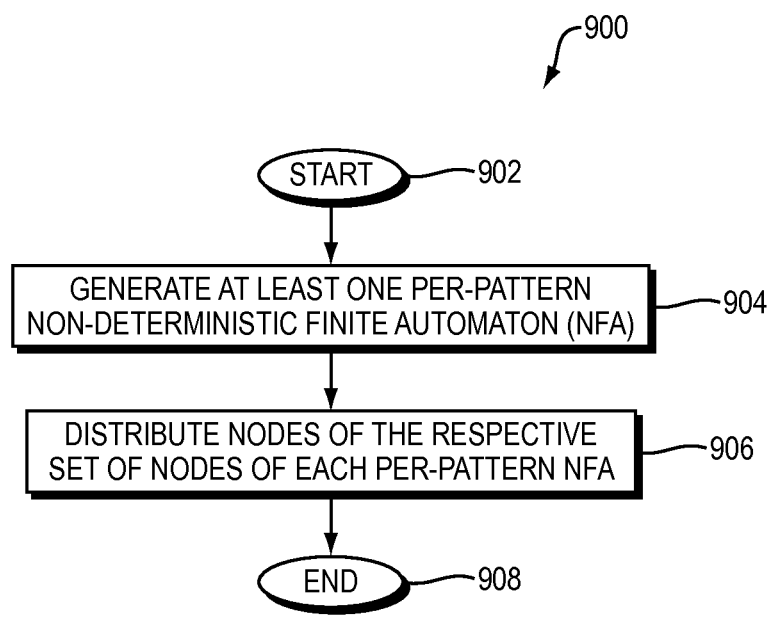
FIG. 9 is a flow diagram of an example embodiment of a method that may be performed in at least one processor operatively coupled to a plurality of memories mapped to hierarchical levels in a memory hierarchy in a security appliance operatively coupled to a network.

FIG. 9 is a flow diagram of an example embodiment of a method 900 that may be performed in at least one processor operatively coupled to a plurality of memories mapped to hierarchical levels in a memory hierarchy in a security appliance operatively coupled to a network. The method may begin (902) and generate at least one per-pattern non-deterministic finite automaton (NFA) (904). Each per-pattern NFA may be generated for a single regular expression pattern and may include a respective set of nodes. The method may distribute nodes of the respective set of nodes of each per-pattern NFA for storing in the plurality of memories based on the hierarchical levels mapped and per-pattern NFA storage allocation settings configured for the hierarchical levels (908) and the method thereafter ends (908) in the example embodiment.

Figure 10:
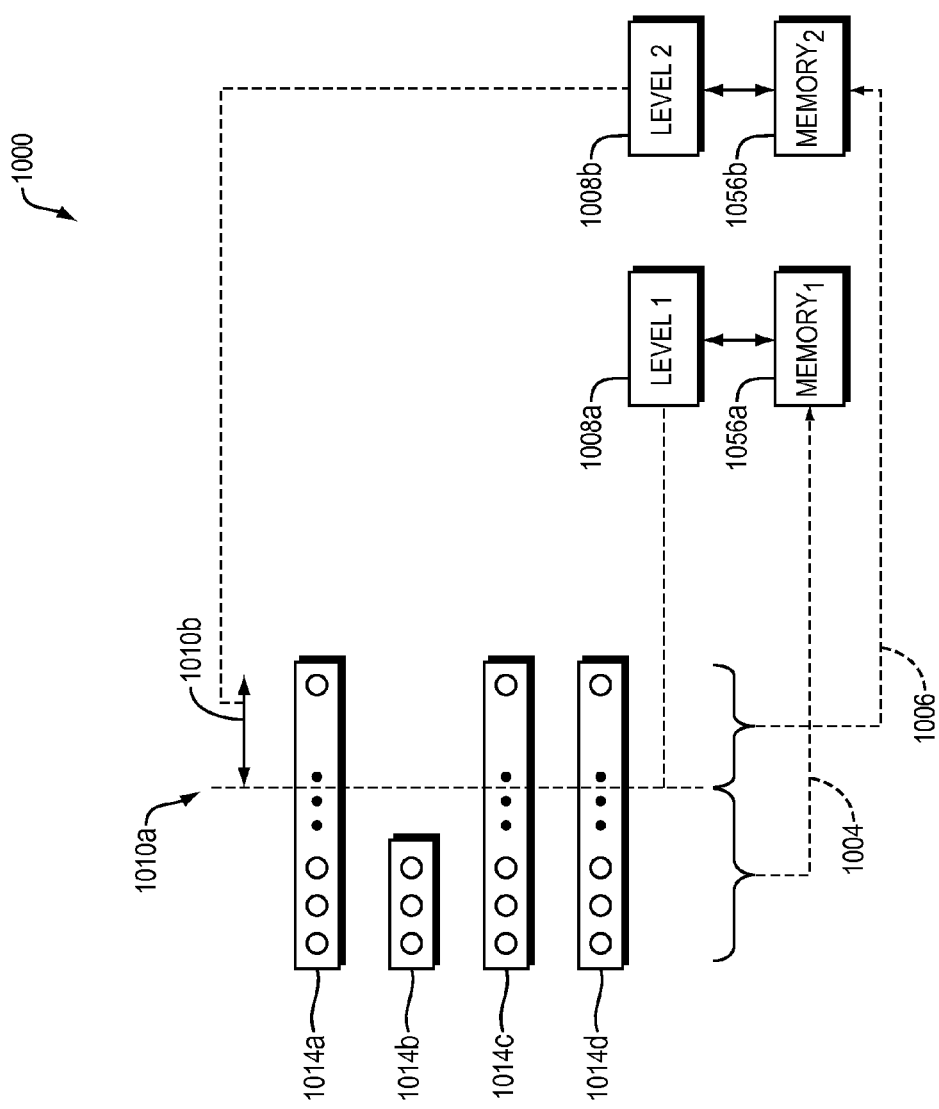
FIG. 10 is a block diagram of an example embodiment of another node distribution for nodes of multiple per-pattern NFAs.

FIG. 10 is a block diagram 1000 of an example embodiment of another node distribution for nodes of multiple per-pattern NFAs. In the example embodiment, node distributions 1004 and 1006 are shown for storing in a first memory 1056*a* and a second memory 1056*b*. The distribution 1004 of each per-pattern NFA 1014*a-c* may be based on per-pattern NFA storage allocation settings 1010*a* and 1010*b* that are configured for the hierarchical levels 1008*a* and 1008*b*, respectively. The hierarchical levels 1008*a* and 1008*b* are mapped to the first memory 1056*a* and the second memory 1056*b*, respectively, in the example embodiment.

Figure 11:
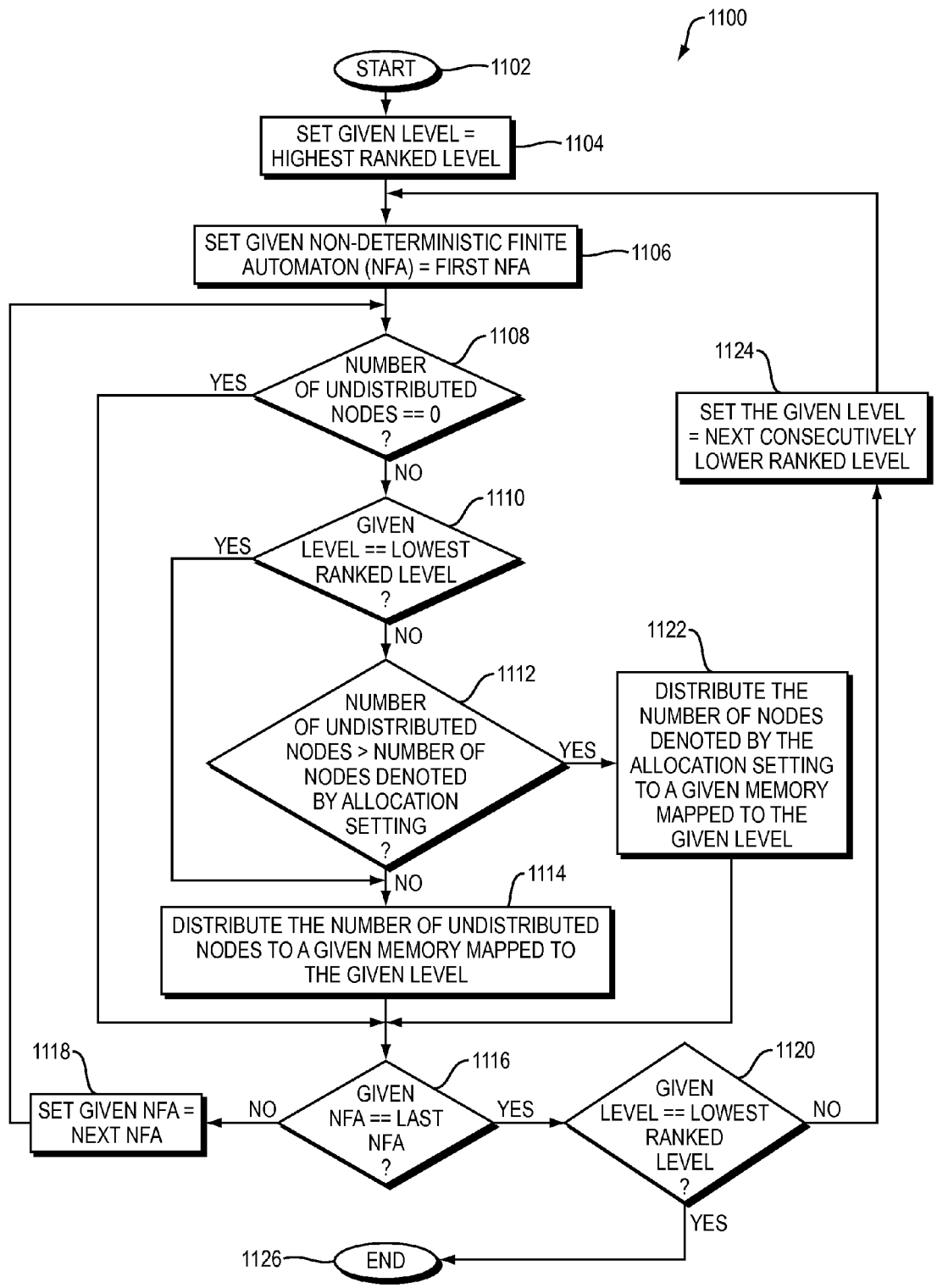
FIG. 11 is a flow diagram of an example embodiment of a method for distributing nodes of at least one per-pattern NFA.

FIG. 11 is a flow diagram 1100 of an example embodiment of a method for distributing nodes of at least one per-pattern NFA. According to embodiments disclosed herein, distributing the nodes of the respective set of nodes of each per-pattern NFA generated may include distributing the nodes of the respective set of nodes in a consecutive manner that includes a first distribution, of the nodes of the respective set of nodes, for storing in a first memory of the plurality of memories. The first memory may be mapped to a highest ranked hierarchical level of the hierarchical levels. Distributing may include at least one second distribution, of the nodes of the respective set of nodes, based on at least one undistributed node remaining in the respective set of nodes after a previous distribution. Each at least one second distribution may be for storing in a given memory of the plurality of memories. The given memory may be mapped to a given hierarchical level of the hierarchical levels, consecutively lower, per distribution, than the highest ranked hierarchical level.

The method may begin (1102) and set a given hierarchical level to a highest ranked hierarchical level in a memory hierarchy (1104). The method may set a given per-pattern NFA to a first per-pattern NFA of at least one NFA generated from a set of one or more regular expression patterns (1106). The method may check for a number of undistributed nodes of the given per-pattern NFA (1108). If the number of undistributed nodes of the given per-pattern NFA is null, the method may check if the given per-pattern NFA is a last NFA generated from the set of one of more regular expression patterns (1116).

If the given per-pattern NFA is the last per-pattern NFA generated, the method may check if the given hierarchical level is a lowest ranked hierarchical level (1120) and if the given hierarchical level is the lowest ranked hierarchical level the method thereafter ends (1126) in the example embodiment. However, if the check for whether the given hierarchical level is a lowest ranked hierarchical level (1120) is no, the method may set the given hierarchical level to a next consecutively lower hierarchical level (1124) and again set the given per-pattern NFA to the first per-pattern NFA of at least one NFA generated from the set of one or more regular expression patterns (1106) and proceed to check for a number of undistributed nodes of the given per-pattern NFA (1108). If the number of undistributed nodes of the given per-pattern NFA is null, the method may proceed as disclosed above.

If the check for the number of undistributed nodes of the given per-pattern NFA (1108) is non-zero, the method may check if the given hierarchical level is the lowest ranked hierarchical level (1110). If yes, the method may distribute the number undistributed nodes to a given memory that is mapped to the given hierarchical level (1114) and the method may check if the given per-pattern NFA is a last NFA generated from the set of one of more regular expression patterns (1116). If yes, the method may proceed as disclosed above. If no, the method the method may set the given per-pattern NFA to the next per-pattern NFA generated (1118) and the method may iterate to check again for the number of undistributed nodes of the given per-pattern NFA (1108) which was updated to the next per-pattern NFA generated.

If the check for whether the given hierarchical level is the lowest ranked hierarchical level (1110) is no, the method may check if the number of undistributed nodes of the given per-pattern NFA exceeds a number of nodes denoted by a per-pattern NFA storage allocation setting configured for the given hierarchical level (1112). If yes, the method may distribute the number of nodes denoted by the per-pattern NFA storage allocation setting configured for the given hierarchical level for storing in the given memory that is mapped to the given hierarchical level (1122) and check whether the given per-pattern NFA is a last NFA generated from the set of one of more regular expression patterns (1116). If yes, the method may proceed as disclosed above.

If the check for whether the given per-pattern NFA is the last per-pattern NFA generated (1116) is no, the method may set the given per-pattern NFA to the next per-pattern NFA generated (1118) and the method may iterate to check again for the number of undistributed nodes of the given per-pattern NFA (1108) which was updated to the next per-pattern NFA generated.

If however, the check for whether the number of undistributed nodes of the given per-pattern NFA exceeds a number of nodes denoted by a per-pattern NFA storage allocation setting configured for the given hierarchical level (1112) is no, the method may distribute the number of undistributed nodes to the given memory that is mapped to the given hierarchical level (1114) and proceed as disclosed above.

According to embodiments disclosed herein, the per-pattern NFA storage allocation settings may denote a target number of unique nodes via an absolute value. The absolute value may be a common value for each respective set of nodes enabling each respective set of nodes to have a same value for the target number of unique nodes for storing in the given memory that is mapped to the respective hierarchical level. For example, as shown in FIG. 10, each of the per-pattern NFAs 1014a-c have a first portion 1004 selected that denotes a same number of nodes from each of the per-pattern NFAs 1014a-c to be distributed to the memory 1056a that is mapped to the hierarchical level 1008a for with the per-pattern storage allocation setting 1010a is configured.

Alternatively, the target number of unique nodes may be denoted via a percentage value for applying to a respective total number of nodes of each respective set of nodes enabling each respective set of nodes to have a separate value for the target number of unique nodes for storing in the given memory that is mapped to the respective hierarchical level. For example, if a number such as 25% were configured for the per-pattern NFA storage allocation setting 1010a configured for the hierarchical level 1008a, then the first portion 1004 would include 25% of the nodes from each of the per-pattern NFAs 1014a-c. Since nodes of each per-pattern NFA 1014a-c may differ, a number of nodes from each of the per-pattern NFAs 1014a-c may differ.

The per-pattern NFA storage allocation settings may include a first per-pattern NFA storage allocation setting and a second per-pattern NFA storage allocation setting. The hierarchical levels may include a highest ranked hierarchical level and a next highest ranked hierarchical level. The first per-pattern NFA storage allocation setting may be configured for the highest ranked hierarchical level. The second per-pattern NFA storage allocation setting may be configured for the next highest ranked hierarchical level. The first per-pattern NFA storage allocation setting may be less than the second per-pattern NFA storage allocation setting. For example, a number of nodes from each per-pattern NFA that are denoted for distribution to a highest performance memory may be less than a number of nodes denoted for a lowest performance memory, such as a system memory, that may have an infinite number denoted.

Embodiments disclosed herein may maximize a number of nodes in a given distribution and the number maximized may be limited by a respective per-pattern NFA storage allocation setting, of the per-pattern NFA storage allocation settings, configured for a given hierarchical level. For example, a number of nodes denoted by a per-pattern NFA storage allocation setting may be ten. As such, each per-pattern NFA that includes ten or more undistributed nodes would have ten nodes distributed. Each per-pattern NFA that includes less than ten undistributed nodes would distribute a respective number of undistributed number of nodes.

Figure 12:
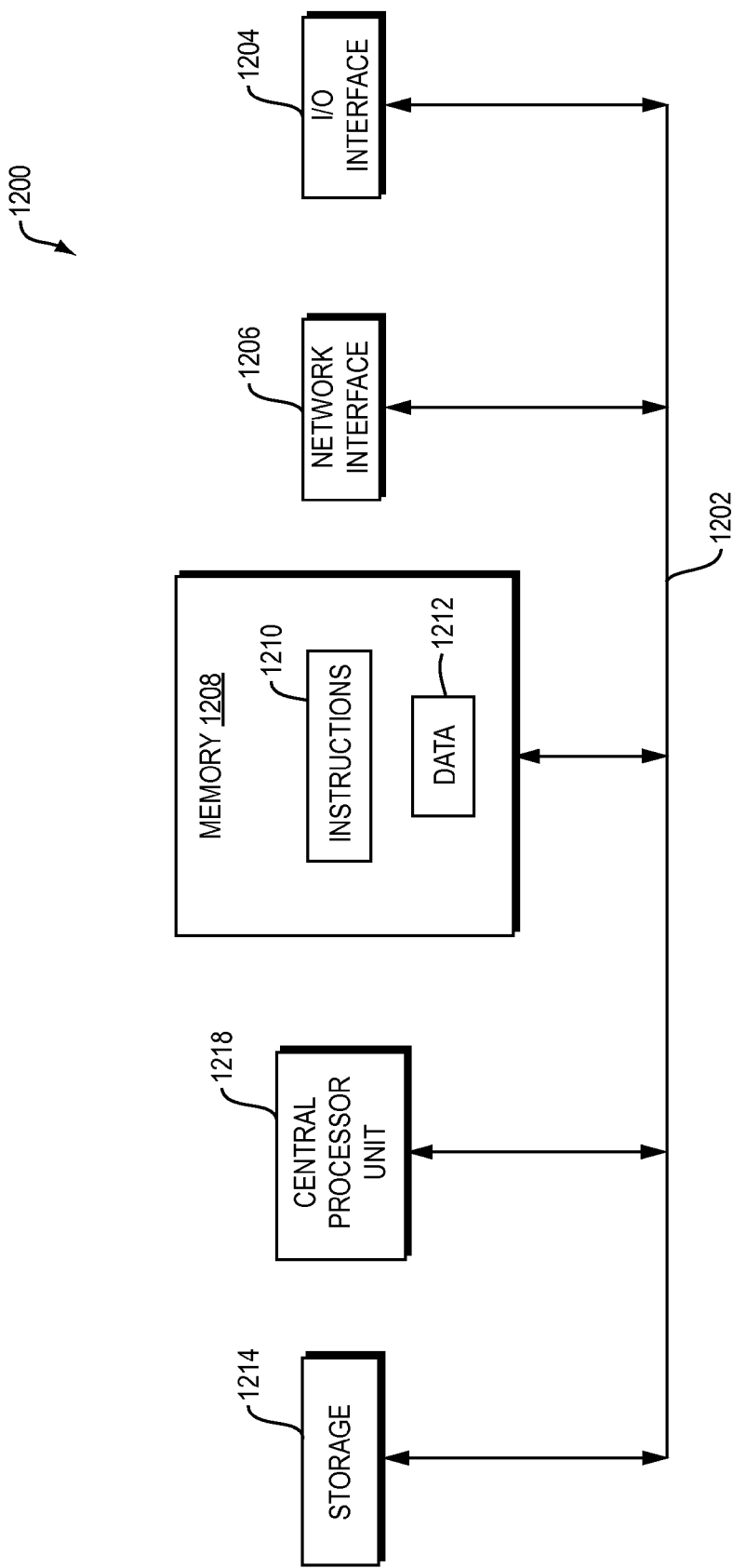
FIG. 12 is a block diagram of an example internal structure of a computer optionally within an embodiment disclosed herein.

FIG. 12 is a block diagram of an example of the internal structure of a computer 1200 in which various embodiments of disclosed herein may be implemented. The computer 1200 contains a system bus 1202, where a bus is a set of hardware lines used for data transfer among the components of a computer or processing system. The system bus 1202 is essentially a shared conduit that connects different elements of a computer system (e.g., processor, disk storage, memory, input/output ports, network ports, etc.) that enables the transfer of information between the elements. Operative with the system bus 1202 is an I/O device interface 1204 for connecting various input and output devices (e.g., keyboard, mouse, displays, printers, speakers, etc.) to the computer 1200. A network interface 1206 allows the computer 1200 to connect to various other devices attached to a network. Memory 1208 provides volatile storage for computer software instructions 1210 and data 1212 that may be used to implement embodiments disclosed herein. Disk storage 1214 provides non-volatile storage for computer software instructions 1210 and data 1212 that may be used to implement embodiments disclosed herein. A central processor unit 1218 is also operative with the system bus 1202 and provides for the execution of computer instructions.

Further example embodiments of disclosed herein may be configured using a computer program product; for example, controls may be programmed in software for implementing example embodiments disclosed herein. Further example embodiments of the disclosed herein may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A security appliance operatively coupled to a network, the security appliance comprising:
    at least one processor;
    at least one network interface configured to receive an input stream including a payload, the security appliance configured to identify an existence of at least one regular expression pattern in the payload of the input stream prior to forwarding the payload;
    a plurality of memories mapped to hierarchical levels in a memory hierarchy and operatively coupled to the at least one processor and the at least one network interface, the at least one processor configured to:
        generate at least one per-pattern non-deterministic finite automaton (NFA), each per-pattern NFA generated for a single regular expression pattern, of the at least one regular expression pattern, and including a respective set of nodes; and
        improve performance of the security appliance by optimizing match performance for identifying the existence of the at least one regular expression pattern, the match performance optimized by distributing nodes, of the respective set of nodes of each per-pattern NFA generated, in the plurality of memories based on the hierarchical levels mapped and per-pattern NFA storage allocation settings configured for the hierarchical levels.

2. The security appliance of claim 1, wherein the at least one processor is further configured to statically store the nodes, of the respective set of nodes of each per-pattern NFA generated, in the plurality of memories, based on the distribution.

3. The security appliance of claim 1, wherein to generate the at least one per-pattern NFA includes specifying a transition from a given node to a next node via a next node address associated with the given node and the next node address is configured to identify the next node and a given memory of the plurality of memories to which the next node is distributed for storing.

4. The security appliance of claim 1, wherein each per-pattern NFA storage allocation setting, of the per-pattern NFA storage allocation settings, is configured for a respective hierarchical level, of the hierarchical levels, to denote a target number of unique nodes, of the respective set of nodes of each per-pattern NFA generated, to distribute for storing in a given memory, of the plurality of memories, that is mapped to the respective hierarchical level.

5. The security appliance of claim 4, wherein the unique nodes of the respective set of nodes are arranged in a consecutive manner within a given per-pattern NFA of the at least one per-pattern NFA including the respective set of nodes.

6. The security appliance of claim 4, wherein each per-pattern NFA storage allocation setting is configured for the respective hierarchical level in a manner enabling the given memory to provide a sufficient storage capacity for storing the target number of unique nodes denoted from each per-pattern NFA generated in an event a per-pattern NFA is generated for each regular expression pattern in a set of regular expression patterns.

7. The security appliance of claim 4, wherein the target number of unique nodes is denoted via an absolute value and is a common value for each respective set of nodes enabling each respective set of nodes to have a same value for the target number of unique nodes for storing in the given memory that is mapped to the respective hierarchical level.

8. The security appliance of claim 4, wherein the target number of unique nodes is denoted via a percentage value for applying to a respective total number of nodes of each respective set of nodes enabling each respective set of nodes to have a separate value for the target number of unique nodes for storing in the given memory that is mapped to the respective hierarchical level.

9. The security appliance of claim 1, wherein each memory of the plurality of memories is mapped to a respective hierarchical level, of the hierarchical levels, consecutively, in descending order, based on a performance ranking of the plurality of memories and a highest performance ranked memory of the plurality of memories is mapped to a highest ranked hierarchical level of the hierarchical levels.

10. The security appliance of claim 1, wherein the per-pattern NFA storage allocation settings include a first per-pattern NFA storage allocation setting and a second per-pattern NFA storage allocation setting, the hierarchical levels include a highest ranked hierarchical level and a next highest ranked hierarchical level, the first per-pattern NFA storage allocation setting is configured for the highest ranked hierarchical level, the second per-pattern NFA storage allocation setting is configured for the next highest ranked hierarchical level.

11. The security appliance of claim 1, wherein to distribute the nodes of the respective set of nodes of each per-pattern NFA generated includes distributing the nodes of the respective set of nodes in a consecutive manner including:
    a first distribution, of the nodes of the respective set of nodes, for storing in a first memory of the plurality of memories, the first memory mapped to a highest ranked hierarchical level of the hierarchical levels; and
    at least one second distribution, of the nodes of the respective set of nodes, based on at least one undistributed node remaining in the respective set of nodes after a previous distribution, each at least one second distribution for storing in a given memory of the plurality of memories, the given memory mapped to a given hierarchical level of the hierarchical levels, consecutively lower, per distribution of the nodes of the respective set of nodes, than the highest ranked hierarchical level.

12. The security appliance of claim 11, wherein a given distribution of the at least one second distribution includes all undistributed nodes remaining in the respective set of nodes if the given hierarchical level is a lowest ranked hierarchical level of the hierarchical levels.

13. The security appliance of claim 11, wherein the at least one processor is further configured to maximize a number of nodes in the first distribution and the number maximized is limited by a respective per-pattern NFA storage allocation setting, of the per-pattern NFA storage allocation settings, configured for the highest ranked hierarchical level.

14. The security appliance of claim 11, wherein the at least one processor is further configured to maximize a number of nodes in each at least one second distribution and the number maximized is limited, per distribution, by a respective per-pattern NFA storage allocation setting, of the per-pattern NFA storage allocation settings, configured for the given hierarchical level.

15. The security appliance of claim 1, wherein the nodes of the respective set of nodes of each per-pattern NFA are statically stored to enable the at least one processor to walk the nodes of each respective set of nodes, with segments of payloads in an input stream received from the network, to determine a match at least one regular expression pattern in the input stream.

16. The security appliance of claim 15, wherein the walk progresses based on individual nodes of the respective set of nodes matching segments of the payloads and the at least one processor is further configured to determine the per-pattern NFA storage allocation settings based on a total number of regular expression patterns in a set of regular expression patterns and a desired performance metric associated with the walk.

17. The security appliance of claim 1, wherein the at least one processor is further configured to:
generate a unified deterministic finite automaton (DFA) based on at least one subpattern selected from each pattern in a set of regular expression patterns; and
store the unified DFA in a given memory of the plurality of memories.

18. The security appliance of claim 1, wherein the plurality of memories include a first memory, a second memory, and a third memory, and the first and second memories are co-located on a chip with the at least one processor and the third memory is an external memory located off the chip and mapped to a lowest ranked hierarchical level of the hierarchical levels.

19. A method comprising:
in at least one processor operatively coupled to at least one network interface and a plurality of memories mapped to hierarchical levels in a memory hierarchy in a security appliance operatively coupled to a network, the at least one network interface configured to receive an input stream including a payload, the security appliance configured to identify an existence of at least one regular expression pattern in the payload of the input stream prior to forwarding the payload:
generating at least one per-pattern non-deterministic finite automaton (NFA), each per-pattern NFA generated for a single regular expression pattern, of the at least one regular expression pattern, and including a respective set of nodes; and
improve performance of the security appliance by optimizing match performance for identifying the existence of the at least one regular expression pattern, the match performance optimized by distributing nodes of the respective set of nodes of each per-pattern NFA in the plurality of memories based on the hierarchical levels mapped and per-pattern NFA storage allocation settings configured for the hierarchical levels.

20. The method of claim 19, further including statically storing the nodes, of the respective set of nodes of each per-pattern NFA generated, in the plurality of memories, based on the distribution.

21. The method of claim 19, wherein generating the at least one per-pattern NFA includes specifying a transition from a given node to a next node via a next node address associated with the given node and configuring the next node address to identify the next node and a given memory of the plurality of memories to which the next node is distributed for storing.

22. The method of claim 19, further including configuring each per-pattern NFA storage allocation setting, of the per-pattern NFA storage allocation settings, for a respective hierarchical level, of the hierarchical levels, to denote a target number of unique nodes, of the respective set of nodes of each per-pattern NFA generated, to distribute for storing in a given memory, of the plurality of memories, that is mapped to the respective hierarchical level.

23. The method of claim 22, wherein the unique nodes of the respective set of nodes are arranged in a consecutive manner within a given per-pattern NFA of the at least one per-pattern NFA including the respective set of nodes.

24. The method of claim 22, further including configuring each per-pattern NFA storage allocation setting for the respective hierarchical level in a manner enabling the given memory to provide a sufficient storage capacity for storing the target number of unique nodes denoted from each per-pattern NFA generated in an event a per-pattern NFA is generated for each regular expression pattern in a set of regular expression patterns.

25. The method of claim 22, further including denoting the target number of unique nodes via an absolute value and is a common value for each respective set of nodes enabling each respective set of nodes to have a same value for the target number of unique nodes for storing in the given memory that is mapped to the respective hierarchical level.

26. The method of claim 22, further including denoting the target number of unique nodes via a percentage value for applying to a respective total number of nodes of each respective set of nodes enabling each respective set of nodes to have a separate value for the target number of unique nodes for storing in the given memory that is mapped to the respective hierarchical level.

27. The method of claim 19, wherein each memory of the plurality of memories is mapped to a respective hierarchical level, of the hierarchical levels, consecutively, in descending order, based on a performance ranking of the plurality of memories and a highest performance ranked memory of the plurality of memories is mapped to a highest ranked hierarchical level of the hierarchical levels.

28. The method of claim 19, wherein the per-pattern NFA storage allocation settings include a first per-pattern NFA storage allocation setting and second per-pattern NFA storage allocation setting, the hierarchical levels include a highest ranked hierarchical level and a next highest ranked hierarchical level, the first per-pattern NFA storage allocation setting is configured for the highest ranked hierarchical level, the second per-pattern NFA storage allocation setting is configured for the next highest ranked hierarchical level.

29. The method of claim 19, wherein distributing the nodes of the respective set of nodes of each per-pattern NFA generated includes distributing the nodes of the respective set of nodes in a consecutive manner including:

a first distribution, of the nodes of the respective set of nodes, for storing in a first memory of the plurality of memories, the first memory mapped to a highest ranked hierarchical level of the hierarchical levels; and at least one second distribution, of the nodes of the respective set of nodes, based on at least one undistributed node remaining in the respective set of nodes after a previous distribution, each at least one second distribution for storing in a given memory of the plurality of memories, the given memory mapped to a given hierarchical level of the hierarchical levels, consecutively lower, per distribution of the nodes of the respective set of nodes, than the highest ranked hierarchical level.

30. The method of claim 29, wherein a given distribution of the at least one second distribution includes all undistributed nodes remaining in the respective set of nodes if the given hierarchical level is a lowest ranked hierarchical level of the hierarchical levels.

31. The method of claim 29, further including maximizing a number of nodes in the first distribution and the number maximized is limited by a respective per-pattern NFA storage allocation setting, of the per-pattern NFA storage allocation settings, configured for the highest ranked hierarchical level.

32. The method of claim 29, further including maximizing a number of nodes in each at least one second distribution and the number maximized is limited, per distribution, by a respective per-pattern NFA storage allocation setting, of the per-pattern NFA storage allocation settings, configured for the given hierarchical level.

33. The method of claim 19, further including statically storing the nodes of the respective set of nodes of each per-pattern NFA enabling a walk of the nodes of each respective set of nodes, with segments of payloads in an input stream received from the network, to determine a match at least one regular expression pattern in the input stream.

34. The method of claim 33, wherein the walk progresses based on individual nodes of the respective set of nodes matching segments of the payloads and the method further includes determining the per-pattern NFA storage allocation settings based on a total number of regular expression patterns in a set of regular expression patterns and a desired performance metric associated with the walk.

35. The method of claim 19, further including:
generating a unified deterministic finite automaton (DFA) based on at least one subpattern selected from each pattern in a set of regular expression patterns; and
storing the unified DFA in a given memory of the plurality of memories.

36. The method of claim 19, wherein the plurality of memories include a first memory, a second memory, and a third memory, and the first and second memories are co-located on a chip with the at least one processor and the third memory is an external memory located off the chip and mapped to a lowest ranked hierarchical level of the hierarchical levels.

37. A non-transitory computer-readable medium having stored thereon a sequence of instructions which, when loaded and executed by a processor operatively coupled to a plurality of memories and at least one network interface in a security appliance, causes the processor to:

generate at least one per-pattern non-deterministic finite automaton (NFA), each per-pattern NFA generated for a single regular expression pattern, of the at least one regular expression pattern, and including a respective set of nodes, the processor operatively coupled to a plurality of memories mapped to hierarchical levels, the at least one network interface configured to receive an input stream including a payload, the security appliance configured to identify an existence of at least one regular expression pattern in the payload of the input stream prior to forwarding the payload; and improve performance of the security appliance by optimizing match performance for identifying the existence of the at least one regular expression pattern, the match performance optimized by distributing nodes of the respective set of nodes of each per-pattern NFA in the plurality of memories based on the hierarchical levels mapped and per-pattern NFA storage allocation settings configured for the hierarchical levels.

\* \* \* \* \*